US012664789B2

(12) United States Patent
Amano

(10) Patent No.: US 12,664,789 B2
(45) Date of Patent: Jun. 23, 2026

(54) OUTSIDE RECOGNITION SYSTEM, VEHICLE CONTROLLER, TRAVEL PATH RECOGNITION METHOD, AND STORAGE MEDIUM

(71) Applicant: HONDA MOTOR CO., LTD., Tokyo (JP)

(72) Inventor: Takashi Amano, Tokyo (JP)

(73) Assignee: HONDA MOTOR CO. LTD., Tokyo (JP)

( * ) Notice: Subject to any disclaimer, the term of this patent is extended or adjusted under 35 U.S.C. 154(b) by 0 days.

(21) Appl. No.: 19/056,769

(22) Filed: Feb. 19, 2025

(65) Prior Publication Data

US 2025/0272988 A1      Aug. 28, 2025

(30) Foreign Application Priority Data

Feb. 22, 2024     (JP) ................................. 2024-025668

(51) Int. Cl.
| | |
|---|---|
| *G06V 20/56* | (2022.01) |
| *G06T 7/12* | (2017.01) |
| *G06T 7/13* | (2017.01) |
| *G06V 10/44* | (2022.01) |
| *G06V 10/764* | (2022.01) |

(52) U.S. Cl.
CPC ................ *G06V 20/56* (2022.01); *G06T 7/12* (2017.01); *G06T 7/13* (2017.01); *G06V 10/44* (2022.01); *G06V 10/764* (2022.01)

(58) Field of Classification Search
CPC .............. G06V 20/56; G06T 7/12; G06T 7/13
USPC .......................................................... 348/148
See application file for complete search history.

(56) References Cited

U.S. PATENT DOCUMENTS

| | | | | |
|---|---|---|---|---|
| 5,734,743 A | * | 3/1998 | Matsugu | ................... G06T 1/00 |
| | | | | 382/173 |
| 8,116,523 B2 | * | 2/2012 | Amagasaki | ............ G06V 20/58 |
| | | | | 382/104 |
| 2017/0300764 A1 | | 10/2017 | Kakegawa et al. | |
| 2020/0219316 A1 | * | 7/2020 | Baik | ..................... G05D 1/2435 |
| 2020/0410257 A1 | * | 12/2020 | Machii | ................... H04N 23/90 |
| 2021/0129862 A1 | * | 5/2021 | Kim | .................. G01C 21/3453 |

FOREIGN PATENT DOCUMENTS

| | | |
|---|---|---|
| JP | 2016099650 A | 5/2016 |

* cited by examiner

*Primary Examiner* — Justin W Rider
(74) *Attorney, Agent, or Firm* — CKC & Partners Co. LLC

(57) ABSTRACT

A travel path recognizer 5 includes: a classifier 50 that classifies photographic objects in a front scene image, and generates an edge image; a parallel edge extractor 51 that extracts an own vehicle division line edge and a plurality of parallel edges from the edge image; a feature ratio parameter calculator 52 that calculates a value of a feature ratio parameter correlated to a feature ratio between a comparison distance between a reference edge and a comparison edge and an own vehicle division line distance between the reference edge and the own vehicle division line edge along a horizontal reference line; and an own vehicle division line estimator 54 that estimates, based on positions of the reference edge and the comparison edge at a current time and a value of the feature ratio parameter at a time earlier than the current time, a position of an own vehicle division line.

18 Claims, 19 Drawing Sheets

| TIME | REFERENCE EDGE | LEFT DIVISION LINE | RIGHT DIVISION LINE | FIRST COMPARISON EDGE | SECOND COMPARISON EDGE | THIRD COMPARISON EDGE |
|---|---|---|---|---|---|---|
| n-5 | 0 | D_LL(n-5) | D_LR(n-5) | D_L1(n-5) | D_L2(n-5) | D_L3(n-5) |
| n-4 | 0 | D_LL(n-4) | D_LR(n-4) | D_L1(n-4) | D_L2(n-4) | D_L3(n-4) |
| n-3 | 0 | D_LL(n-3) | D_LR(n-3) | D_L1(n-3) | D_L2(n-3) | D_L3(n-3) |
| n-2 | 0 | D_LL(n-2) | D_LR(n-2) | - | D_L2(n-2) | D_L3(n-2) |
| n-1 | 0 | D_LL(n-1) | D_LR(n-1) | - | D_L2(n-1) | D_L3(n-1) |
| n | 0 | - | - | - | D_L2(n) | - |

| | Ea | Eb | Ec | Ed (OWN VEHICLE DIVISION LINE) | Ee (OWN VEHICLE DIVISION LINE) | Ef | Eg | Eh | Ei |
|---|---|---|---|---|---|---|---|---|---|
| FIRST PARTITION DIVISION | × | × | ○ | ○ | ○ | × | × | × | × |
| SECOND PARTITION DIVISION | × | × | ○ | ○ | ○ | ○ | × | × | × |
| THIRD PARTITION DIVISION | △ | △ | ○ | ○ | ○ | ○ | △ | × | × |
| FOURTH PARTITION DIVISION | △ | ○ | ○ | ○ | ○ | ○ | ○ | △ | △ |

FIG. 13 m-TH PARTITION DIVISION

| TIME | REFERENCE EDGE | LEFT DIVISION LINE | RIGHT DIVISION LINE | FIRST COMPARISON EDGE | SECOND COMPARISON EDGE | THIRD COMPARISON EDGE |
|---|---|---|---|---|---|---|
| | | | | | | m(n-5) |
| | | | | | | m(n-4) |
| | | | | | | m(n-3) |
| | | | | | | m(n-2) |
| | | | | | | m(n-1) |
| | | | | | | - |

SECOND PARTITION DIVISION

| TIME | REFERENCE EDGE | LEFT DIVISION LINE | RIGHT DIVISION LINE | FIRST COMPARISON EDGE | SECOND COMPARISON EDGE | THIRD COMPARISON EDGE |
|---|---|---|---|---|---|---|
| | | | | | | n-5 |
| | | | | | | n-4 |
| | | | | | | n-3 |
| | | | | | | n-2 |
| | | | | | | n-1 |

FIRST PARTITION DIVISION

| TIME | REFERENCE EDGE | LEFT DIVISION LINE | RIGHT DIVISION LINE | FIRST COMPARISON EDGE | SECOND COMPARISON EDGE | THIRD COMPARISON EDGE |
|---|---|---|---|---|---|---|
| n-5 | 0 | $D\_LL\_1(n-5)$ | $D\_LR\_1(n-5)$ | $D\_L1\_1(n-5)$ | $D\_L2\_1(n-5)$ | $D\_L3\_1(n-5)$ |
| n-4 | 0 | $D\_LL\_1(n-4)$ | $D\_LR\_1(n-4)$ | $D\_L1\_1(n-4)$ | $D\_L2\_1(n-4)$ | $D\_L3\_1(n-4)$ |
| n-3 | 0 | $D\_LL\_1(n-3)$ | $D\_LR\_1(n-3)$ | $D\_L1\_1(n-3)$ | $D\_L2\_1(n-3)$ | $D\_L3\_1(n-3)$ |
| n-2 | 0 | $D\_LL\_1(n-2)$ | $D\_LR\_1(n-2)$ | - | $D\_L2\_1(n-2)$ | $D\_L3\_1(n-2)$ |
| n-1 | 0 | $D\_LL\_1(n-1)$ | $D\_LR\_1(n-1)$ | - | $D\_L2\_1(n-1)$ | $D\_L3\_1(n-1)$ |
| n | 0 | - | - | - | $D\_L2\_1(n)$ | - |

FIG. 16

OUTSIDE RECOGNITION SYSTEM, VEHICLE CONTROLLER, TRAVEL PATH RECOGNITION METHOD, AND STORAGE MEDIUM

This application is based on and claims the benefit of priority from Japanese Patent Application No. 2024-025668, filed on 22 Feb. 2024, the content of which is incorporated herein by reference.

BACKGROUND OF THE INVENTION

Field of the Invention

The present invention relates to an outside recognition system, a vehicle controller, a travel path recognition method, and a storage medium. More specifically, the present invention relates to an outside recognition system, a vehicle controller, a travel path recognition method, and a storage medium for recognizing a travel path based on a front scene image of an own vehicle.

Related Art

Recently, effort has been made to provide accesses to sustainable transportation systems in which those people who are in vulnerable situations among traffic participants are taken into consideration. To achieve this, the applicant has focused on, through research and development relating to preventive safety techniques, research and development for further improvements on safety and convenience in traffic.

For example, Japanese Unexamined Patent Application, Publication No. 2016-099650 describes a preventive safety technique for recognizing white lines and road edges (hereinafter also referred to as "own vehicle division lines"), for example, that divide a travel path of an own vehicle based on an image of a scene in front of the own vehicle, which is acquired by an on-vehicle camera. When an own vehicle division line is to be recognized based on an image as described above, various factors such as interrupted road edge, backlight, unclear white line, and existence of foreign materials including water puddle may lower accuracy of recognition. In response to these issues, the technique described in Japanese Unexamined Patent Application, Publication No. 2016-099650 allows a direction of a travel path to be estimated based on a direction of a linear portion included in an image acquired by an imager and a direction of an end of a plane region included in a distance image including three-dimensional distance information generated based on the image acquired by the imager or distance information detected by a distance detector.

Patent Document 1: Japanese Unexamined Patent Application, Publication No. 2016-099650

SUMMARY OF THE INVENTION

By the way, the technique described in Japanese Unexamined Patent Application, Publication No. 2016-099650 is useful when it is impossible to properly recognize a part of an own vehicle division line that is supposed to exist originally, due to some reasons including backlight and unclearness, as described above. However, at a point where no own vehicle division line exists originally, such as a central portion of an intersection, it is impossible to recognize an own vehicle division line with the technique described in Japanese Unexamined Patent Application, Publication No. 2016-099650. That is, it is impossible to recognize an own vehicle division line when there is no own vehicle division line seen at all in an image acquired by the on-vehicle camera with the technique described in Japanese Unexamined Patent Application, Publication No. 2016-099650.

An object of the present invention is to provide an outside recognition system, a vehicle controller, a travel path recognition method, and a storage medium making it possible, even when there is no own vehicle division line seen in a front scene image, to allow existence of an own vehicle division line to be recognized, and, furthermore, to contribute to development of sustainable transportation systems.

(1) An outside recognition system according to the present invention includes: a front scene image acquirer that acquires an image of a scene on a front side seen from an own vehicle as a front scene image; and a travel path recognizer that recognizes a travel path of the own vehicle based on the front scene image, in which the travel path recognizer includes: a classifier that performs segmentation processing on the front scene image to classify photographic objects in the front scene image into a plurality of classes including an own vehicle division line dividing the travel path, and to generate an edge image in which edges of the classes are extracted; a parallel edge extractor that extracts, from the edge image for the classes, an own vehicle division line edge that is an edge of the own vehicle division line and a plurality of parallel edges that are parallel to the own vehicle division line edge when a field of view of the front scene image acquirer is seen in a plan view, and selects one of the plurality of parallel edges as a reference edge; a feature ratio parameter calculator that calculates a value of a feature ratio parameter correlated to a feature ratio between a first distance, when the edges other than the reference edge in the plurality of parallel edges are designated as comparison edges, between the reference edge and each of the comparison edges and a second distance between the reference edge and the own vehicle division line edge along a horizontal reference line extending in width directions in the edge image; a storage that stores a value of the feature ratio parameter, the value being calculated by the feature ratio parameter calculator at a time earlier than a current time; and an own vehicle division line estimator that estimates, based on positions of the reference edge and the comparison edges at the current time and the value of the feature ratio parameter, the value being stored in the storage, a position of the own vehicle division line at the current time.

(2) In this case, the parallel edge extractor may preferably extract, as the parallel edges, edges extending toward a vanishing range centered around a vanishing point that is common in the edge image.

(3) In this case, the parallel edge extractor may preferably use one or more section lines that is or are parallel to the horizontal reference line to partition, in a virtual manner, the edges existing in the edge image each into a plurality of edge line segments, and extract the edges each including the plurality of edge line segments each extending toward the vanishing range designated for each of partition divisions divided in a virtual manner by the one or more section lines in the plurality of edges included in the edge image as the parallel edges.

(4) In this case, the feature ratio parameter calculator may preferably calculate a value of the feature ratio parameter for each of the partition divisions, the storage may preferably store the value of the feature ratio parameter, the value being calculated by the feature ratio parameter calculator, for each of the partition divisions, and the own vehicle division line estimator may preferably estimate, based on the value of the feature ratio parameter, the value being stored in the storage for each of the partition divisions, the position of the own vehicle division line at the current time for each of the partition divisions.

(5) In this case, the travel path recognizer may preferably further include a confidence degree calculator that calculates a value of a confidence degree for each of the comparison edges based on a comparison between a position of the own vehicle division line edge extracted by the parallel edge extractor and the position of the own vehicle division line, the position being estimated by the own vehicle division line estimator, the storage may preferably store a value of the confidence degree, the value being calculated by the confidence degree calculator, at a time earlier than the current time, and the own vehicle division line estimator may preferably estimate, based on the positions of the reference edge and the comparison edges at the current time and the values of the feature ratio parameter and the confidence degree, the values being stored in the storage, the position of the own vehicle division line at the current time.

(6) In this case, the own vehicle division line estimator may preferably estimate the position of the own vehicle division line at the current time to allow the value of the feature ratio at the current time and the value of the feature ratio, the value being calculated based on the value of the feature ratio parameter, the value being stored in the storage, to be equal to each other.

(7) In this case, the own vehicle division line estimator may preferably include: a model estimator that uses an own vehicle division line position estimation model causing the positions of the reference edge and the comparison edges to be associated with the position of the own vehicle division line to estimate the position of the own vehicle division line at the current time; and a model updater that updates the own vehicle division line position estimation model based on the value of the feature ratio parameter, the value being stored in the storage.

(8) A vehicle controller according to the present invention includes: the outside recognition system; and a controller that controls at least one of a steering mechanism, a travel driving device, or a braking device in the own vehicle based on a result of the recognition by the outside recognition system, in which the controller controls, when there is no photographic object classified into the own vehicle division line seen in the front scene image, at least one of the steering mechanism, the travel driving device, or the braking device based on the position of the own vehicle division line, the position being estimated by the own vehicle division line estimator.

(9) A travel path recognition method according to the present invention is a method of causing a computer to recognize, based on a front scene image acquired by a front scene image acquirer that images a scene on a front side seen from an own vehicle, a travel path of the own vehicle, the travel path recognition method including: performing segmentation processing on the front scene image to classify photographic objects in the front scene image into a plurality of classes including an own vehicle division line dividing the travel path, and to generate an edge image in which edges of the classes are extracted; extracting, from the edge image for the classes, an own vehicle division line edge that is an edge of the own vehicle division line and a plurality of parallel edges that are parallel to the own vehicle division line edge when a field of view of the front scene image acquirer is seen in a plan view, and selecting one of the plurality of parallel edges as a reference edge; calculating a value of a feature ratio parameter correlated to a feature ratio between a first distance, when the edges other than the reference edge in the plurality of parallel edges are designated as comparison edges, between the reference edge and each of the comparison edges and a second distance between the reference edge and the own vehicle division line edge along a horizontal reference line extending in width directions in the edge image; allowing a storage to store a value of the feature ratio parameter at a time earlier than a current time; and estimating, based on positions of the reference edge and the comparison edges at the current time and the value of the feature ratio parameter, the value being stored in the storage, a position of the own vehicle division line at the current time.

(10) A storage medium according to the present invention stores a computer program causing a computer to recognize, based on a front scene image acquired by a front scene image acquirer that images a scene on a front side seen from an own vehicle, a travel path of the own vehicle, the computer program causing the computer to execute a process including: performing segmentation processing on the front scene image to classify photographic objects in the front scene image into a plurality of classes including an own vehicle division line dividing the travel path, and to generate an edge image in which edges of the classes are extracted; extracting, from the edge image for the classes, an own vehicle division line edge that is an edge of the own vehicle division line and a plurality of parallel edges that are parallel to the own vehicle division line edge when a field of view of the front scene image acquirer is seen in a plan view, and selecting one of the plurality of parallel edges as a reference edge; calculating a value of a feature ratio parameter correlated to a feature ratio between a first distance, when the edges other than the reference edge in the plurality of parallel edges are designated as comparison edges, between the reference edge and each of the comparison edges and a second distance between the reference edge and the own vehicle division line edge along a horizontal reference line extending in width directions in the edge image; allowing a storage to store a value of the feature ratio parameter at a time earlier than a current time; and estimating, based on positions of the reference edge and the comparison edges at the current time and the value of the feature ratio parameter, the value being stored in the storage, a position of the own vehicle division line at the current time.

(1) In the present invention, the classifier performs segmentation processing on a front scene image of the own vehicle to classify photographic objects in the front scene image into a plurality of classes (including an own vehicle division line), and to generate an edge image in which edges of the classes are extracted. The parallel edge extractor extracts, from the edge image, an own vehicle division line edge and a plurality of parallel edges that are parallel to the own vehicle division line edge in a plan view, and selects one of the plurality of parallel edges as a reference edge. The feature ratio parameter calculator calculates a value of a feature ratio parameter correlated to a feature ratio between a first distance (a distance between the reference edge and each of comparison edges) and a second distance (a distance between the reference edge and the own vehicle division line edge) along a horizontal reference line, and the storage stores a value of the feature ratio parameter, the value being calculated by the feature ratio parameter calculator at a time earlier than the current time. Note herein that, as will be described later with reference to FIG. 5, with respect to the feature ratio that is the ratio between the first distance and the second distance, a constant geometrical relationship is established regardless of a position in a depth direction of a horizontal reference line in a front scene image. Then, the own vehicle division line estimator utilizes the geometrical relationship with respect to the feature ratio as described above to estimate, based on the positions of the reference edge and the comparison edges at the current time and the value of the feature ratio parameter at the time earlier than the current time, the value being stored in the storage, the position of the own vehicle division line at the current time. Therefore, according to the present invention, it is possible, even when there is no own vehicle division line seen in a front scene image, to allow existence of an own vehicle division line to be recognized, and, furthermore, to contribute to development of sustainable transportation systems.

(2) The parallel edge extractor extracts, as the parallel edges, edges extending toward a vanishing range centered around a vanishing point that is common in the edge image. Thereby, it is possible to easily extract a plurality of parallel edges.

(3) When a travel path of the own vehicle is curved to left or right, as will be described later with reference to FIG. 9, an own vehicle division line edge and parallel edges that are parallel in a plan view to the own vehicle division line edge are curved in an edge image, and, therefore, it is more difficult to extract the parallel edges than a case when a travel path is a straight line. Then, the parallel edge extractor uses one or more section lines that is or are parallel to the horizontal reference line to partition, in a virtual manner, the edges existing in the edge image each into a plurality of edge line segments, and extracts the edges each including the plurality of edge line segments each extending toward the vanishing range designated for each of partition divisions divided in a virtual manner by the one or more section lines in the plurality of edges included in the edge image as the parallel edges. Therefore, according to the present invention, it is possible to easily extract a plurality of parallel edges even when a travel path is curved.

(4) The feature ratio parameter calculator calculates a value of the feature ratio parameter for each of the partition divisions, the storage stores the value of the feature ratio parameter, the value being calculated by the feature ratio parameter calculator, for each of the partition divisions, and the own vehicle division line estimator estimates, based on the value of the feature ratio parameter, the value being stored in the storage for each of the partition divisions, the position of the own vehicle division line at the current time for each of the partition divisions. Therefore, according to the present invention, it is possible to easily estimate a position of an own vehicle division line even when a travel path is curved.

(5) A value of the feature ratio or the feature ratio parameter changes depending on a position of a comparison edge selected from a plurality of parallel edges. Therefore, as a confidence degree of a comparison edge lowers, a confidence degree of a position of an own vehicle division line, the position being estimated based on a position of the comparison edge, also lowers. Then, the confidence degree calculator calculates a value of a confidence degree for each of the comparison edges based on a comparison between a position of the own vehicle division line edge extracted by the parallel edge extractor and the position of the own vehicle division line, the position being estimated by the own vehicle division line estimator, the storage stores a value of the confidence degree, the value being calculated by the confidence degree calculator, at a time earlier than the current time, and the own vehicle division line estimator estimates, based on the positions of the reference edge and the comparison edges at the current time and the values of the feature ratio parameter and the confidence degree, the values being stored in the storage, the position of the own vehicle division line at the current time. Therefore, according to the present invention, it is possible to estimate a position of an own vehicle division line by taking into consideration a confidence degree of a comparison edge.

(6) The own vehicle division line estimator estimates the position of the own vehicle division line at the current time to allow the value of the feature ratio at the current time and the value of the feature ratio, the value being calculated based on the value of the feature ratio parameter, the value being stored in the storage, to be equal to each other. Therefore, according to the present invention, it is possible to estimate a position of an own vehicle division line through simple arithmetic operation in the own vehicle division line estimator.

(7) The model estimator uses an own vehicle division line position estimation model causing the positions of the reference edge and the comparison edges to be associated with the position of the own vehicle division line to estimate the position of the own vehicle division line at the current time, and the model updater updates the own vehicle division line position estimation model based on the value of the feature ratio parameter, the value being stored in the storage. Therefore, according to the present invention, it is possible to update an input-and-output relationship in the own vehicle division line position estimation model in accordance with a change in shape of a road (including a number of lanes and a lane width, for example) during traveling, making it possible to properly estimate a position of an own vehicle division line in accordance with a change in shape of the road.

(8) The vehicle controller according to the present invention includes: the outside recognition system as described above; and the controller that controls at least one of the steering mechanism, the travel driving device, or the braking device in the own vehicle based on a result of the recognition by the outside recognition system. Furthermore, the controller controls, when there is no photographic object classified into the own vehicle division line seen in the front scene image, at least one of the steering mechanism, the travel driving device, or the braking device based on the position of the own vehicle division line, the position being estimated by the own vehicle division line estimator in the outside recognition system. Therefore, according to the present invention, it is possible to continue control by the controller even when there is no existing own vehicle division line during traveling.

(9) With the travel path recognition method according to the present invention, effects similar or identical to the effects achieved with the outside recognition system described above are achieved.

(10) With the storage medium according to the present invention, effects similar or identical to the effects achieved with the outside recognition system described above are achieved.

BRIEF DESCRIPTION OF THE DRAWINGS

FIG. 2 is a functional block diagram of a travel path recognizer;

FIG. 4B is a view in which some of straight lines extracted from the parameter space illustrated in FIG. 4A are high-lighted;

FIG. 6 is a view illustrating an example of time-series data of values of feature ratio parameters, which is stored in a storage unit;

FIG. 11 is a view for describing a procedure of extracting a plurality of parallel edges in a parallel edge extractor;

FIG. 12 is a view illustrating an example of a result when the parallel edge extractor has evaluated a plurality of edge line segments included in the four partition divisions illustrated in FIG. 10;

FIG. 13 is a view illustrating time-series data of values of feature ratio parameters, which are stored in the storage unit;

FIG. 16 is a functional block diagram of a travel path recognizer in an outside recognition system according to a fourth embodiment of the present invention;

DETAILED DESCRIPTION OF THE INVENTION

First Embodiment

A vehicle controller and an outside recognition system according to a first embodiment of the present invention will now be described herein with reference to the accompanying drawings.

Figure 1:
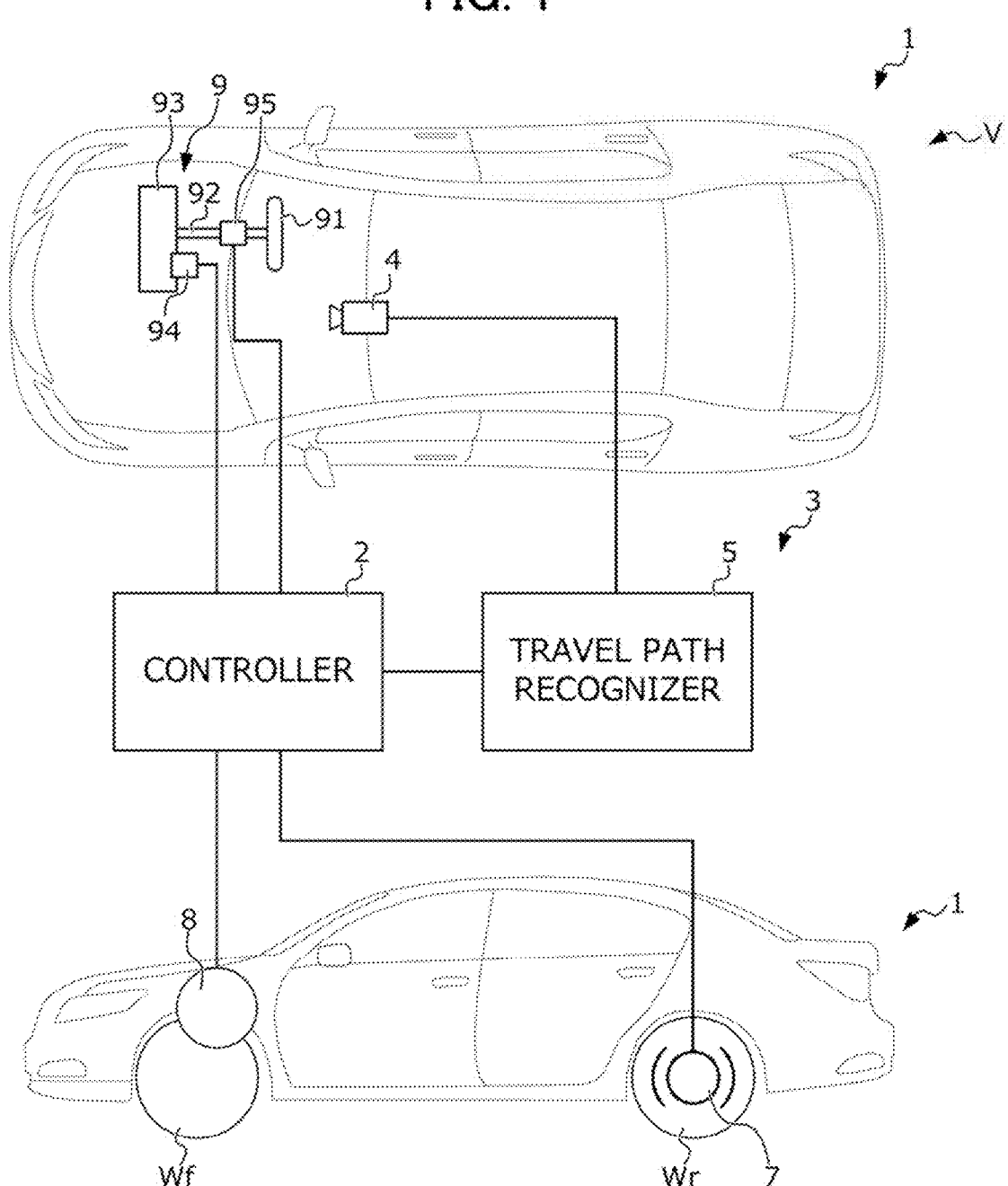
FIG. 1 is a view schematically illustrating a configuration of a vehicle mounted with a vehicle controller and an outside recognition system according to a first embodiment of the present invention.

FIG. 1 is a view schematically illustrating a configuration of a vehicle V mounted with a vehicle controller 1 and an outside recognition system 3 according to the present embodiment. An upper part of FIG. 1 illustrates a plan view of the vehicle V, and a lower part of FIG. 1 illustrates its side view. Note that, although it is described below, for example, a case where the vehicle V is a so-called right steering wheel four-wheel vehicle in which a driver's seat on which a driver sits is provided on a right side in vehicle width directions when seen in an advancing direction, the present invention is not limited to the case. The vehicle V may be a so-called left steering wheel four-wheel vehicle in which the driver's seat is provided on a left side in the vehicle width directions when seen in the advancing direction.

The vehicle V includes an electric power steering device 9 serving as a steering mechanism for steering left and right front wheels Wf, a power plant 8 serving as a travel driving device that generates a travel driving force for rotating the front wheels Wf serving as drive wheels in the vehicle V, a braking device 7 that generates a braking force for stopping rotation of the front wheels Wf and rear wheels Wr, and the vehicle controller 1 that controls the electric power steering device 9, the power plant 8, and the braking device 7.

The electric power steering device 9 includes a gear box 93 coupling a pinion shaft 92 extending from a steering wheel 91 that accepts a steering maneuver by the driver and the left and right front wheels Wf to each other, an electric motor 94 provided in the gear box 93, and a steering sensor 95 that detects a steering angle of the steering wheel 91.

The gear box 93 includes, for example, a rack shaft extending in the vehicle width directions and engaging the pinion shaft 92 and tie rods respectively coupling both ends of the rack shaft and the left and right front wheels Wf to each other, and converts a rotational movement of the steering wheel 91 due to a steering maneuver of the driver into a movement in one of the vehicle width directions to steer the left and right front wheels Wf in the advancing direction. The electric motor 94 rotates in accordance with a control signal outputted from the vehicle controller 1 to assist a steering maneuver by the driver and to generate a driving force for automatically steering the front wheels Wf without depending on a steering maneuver by the driver. The steering sensor 95 detects a steering angle of the steering wheel 91 and transmits a signal in accordance with a detection value to the vehicle controller 1.

The power plant 8 is a driving force generation source that generates a travel driving force for rotating the front wheels Wf for causing the vehicle V to move forward in the advancing direction or backward in accordance with an acceleration or deceleration maneuver of an accelerator pedal (not illustrated) by the driver and a control signal outputted from the vehicle controller 1. Although it is described below, for example, a case where, as the power plant 8, a drive motor that consumes electrical power supplied from a non-illustrated high voltage battery or fuel cell stack to generate a travel driving force is used, the present invention is not limited to the case. As the power plant 8, an engine that consumes fuel stored in a non-illustrated fuel tank to generate a travel driving force and a transmission that changes in speed and transmits an output of the engine to the front wheels Wf.

The braking device 7 includes, for example, a disc brake device that, based on a braking maneuver of a brake pedal (not illustrated) by the driver and a control signal outputted from the vehicle controller 1, for example, generates a braking force for tightly pinching discs provided to axles of the wheels Wf, Wr mainly during traveling to decelerate or stop rotation of the wheels Wf, Wr and a parking brake that generates a braking force for keeping the wheels Wr, Wf in a state where rotation is stopped mainly during parking.

The vehicle controller 1 includes the outside recognition system 3 that acquires outside information (a position of and a distance to an obstacle or another vehicle, a relative speed and an advancing direction of the other vehicle, and a travel path of the vehicle V, for example) related to those around the vehicle V to recognize a situation outside the vehicle V and a controller 2 that controls, based on a result of the recognition by the outside recognition system 3, at least one of the electric power steering device 9, the power plant 8, or the braking device 7. Note that it is mainly described below in detail only a configuration related to a function of recognizing a travel path of the vehicle V (hereinafter also referred to as a "travel path recognition function") in the outside recognition system 3 having the outside recognition function as described above.

The outside recognition system 3 includes an on-vehicle front camera 4 that acquires an image of a scene on a front side seen from the vehicle V as a front scene image and a travel path recognizer 5 that recognizes a travel path of the vehicle V based on the front scene image acquired by the on-vehicle front camera 4.

The on-vehicle front camera 4 is a camera that images a scene on the front side in the advancing direction of the vehicle V. The on-vehicle front camera 4 is attached, for example, to a roof of the vehicle V at a position near a front window inside a vehicle cabin. The front scene image imaged by the on-vehicle front camera 4 is successively transmitted to the travel path recognizer 5.

The travel path recognizer 5 performs arithmetic processing described below on the front scene image successively acquired by the on-vehicle front camera 4 while the vehicle V is traveling to recognize a position of a travel path of the vehicle V, that is, positions of a left own vehicle division line and a right own vehicle division line on both left and right sides in the vehicle width directions of an own vehicle travel path (hereinafter also collectively referred to as "own vehicle division lines"). The travel path recognizer 5 transmits information related to a result of the recognition of the own vehicle division lines to the controller 2.

The travel path recognizer 5 is a computer configured based on hardware including, for example, an arithmetic processor such as a central processing unit (CPU), an auxiliary storage such as a hard disk drive (HDD) or a solid state drive (SSD) that stores programs causing the arithmetic processor to execute travel path recognition processing described later, and a main storage including a random access memory (RAM) that stores data temporarily required for the arithmetic processor to execute the programs.

Figure 2:
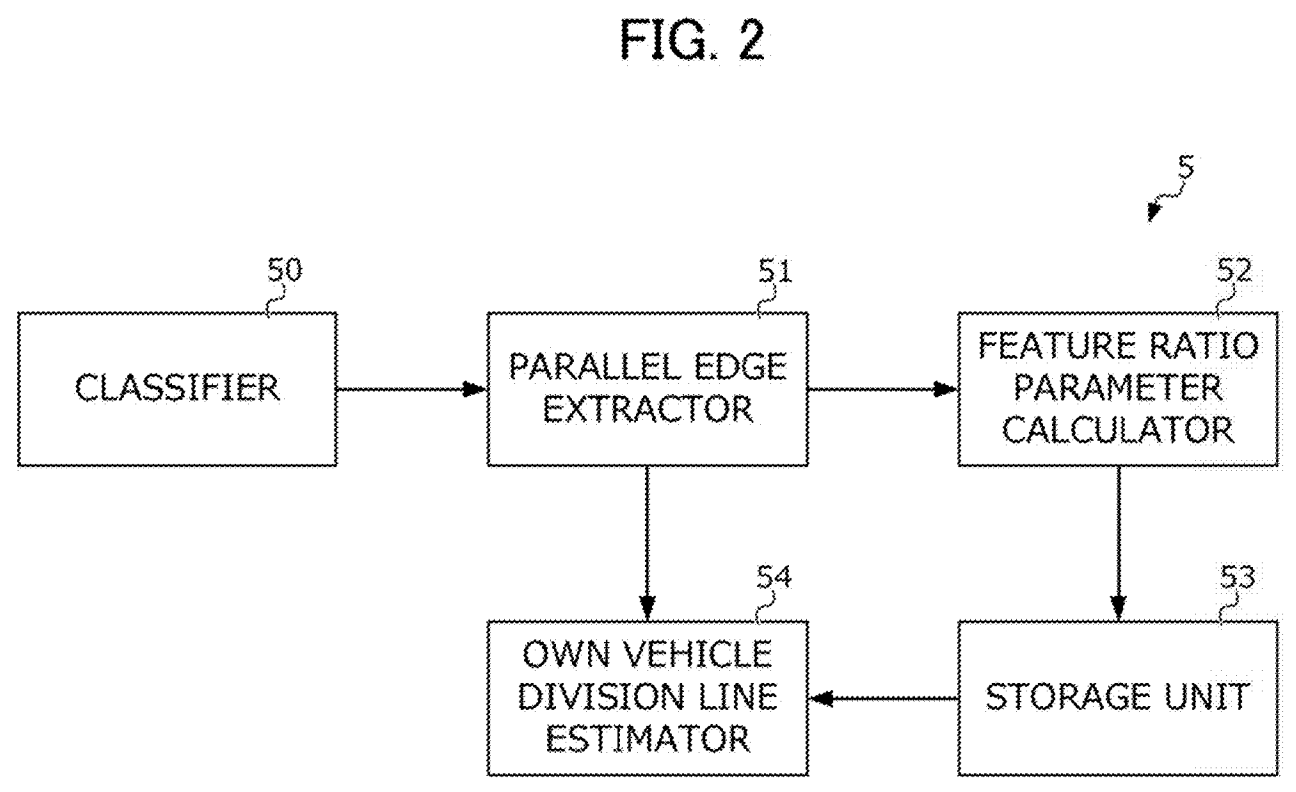

FIG. 2 is a functional block diagram of the travel path recognizer 5. With such hardware configuration as described above in the travel path recognizer 5, a classifier 50, a parallel edge extractor 51, a feature ratio parameter calculator 52, a storage unit 53, and an own vehicle division line estimator 54 are configured.

The classifier 50 performs known segmentation processing (for example, semantic segmentation processing) on the front scene image acquired by the on-vehicle front camera 4 to classify photographic objects in the front scene image into a plurality of classes including an own vehicle division line, and to generate an edge image in which edges of the classes are extracted. The classifier 50 transmits the generated edge image and information related to the plurality of classes included in the edge image to the parallel edge extractor 51.

Figure 3A:
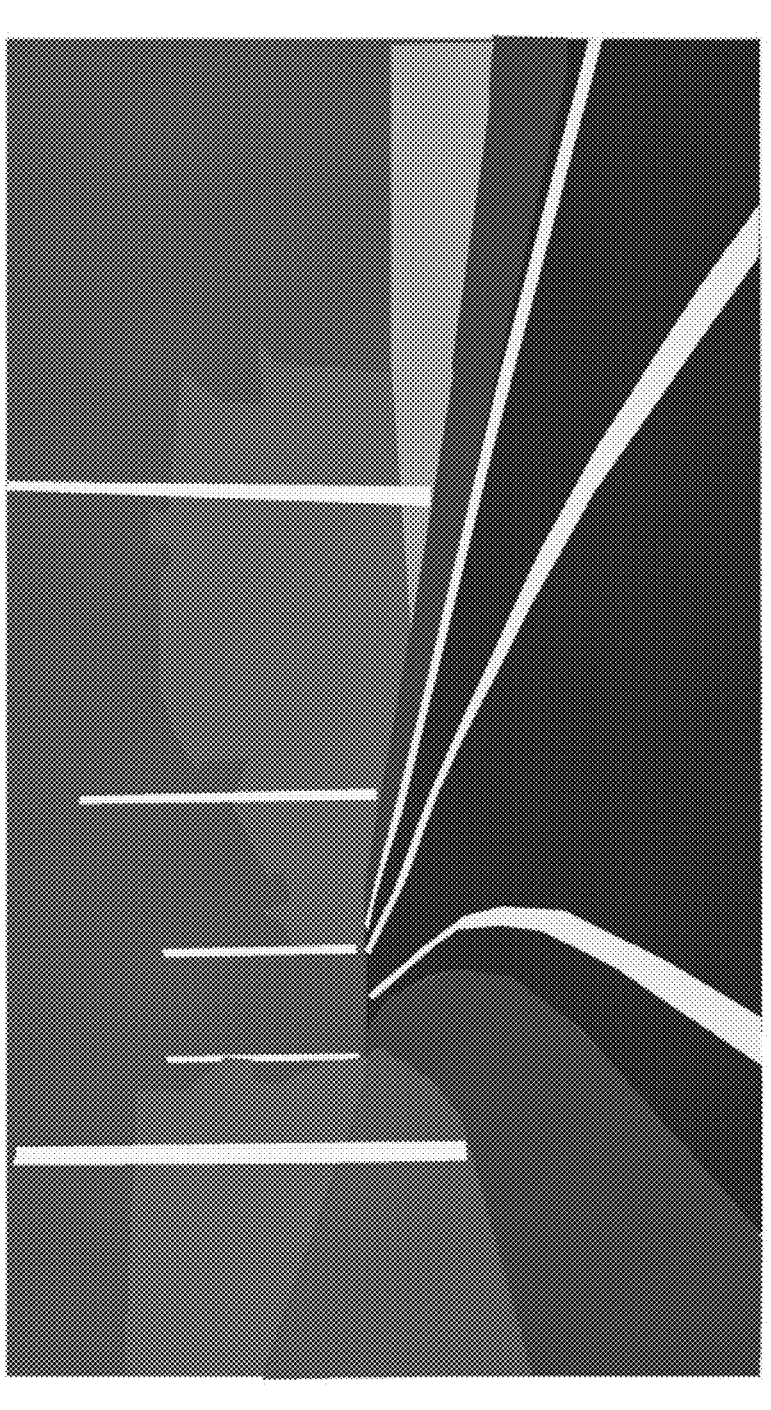
FIG. 3A is a view illustrating an example when a plurality of classes extracted from a front scene image are colored.
Figure 3B:
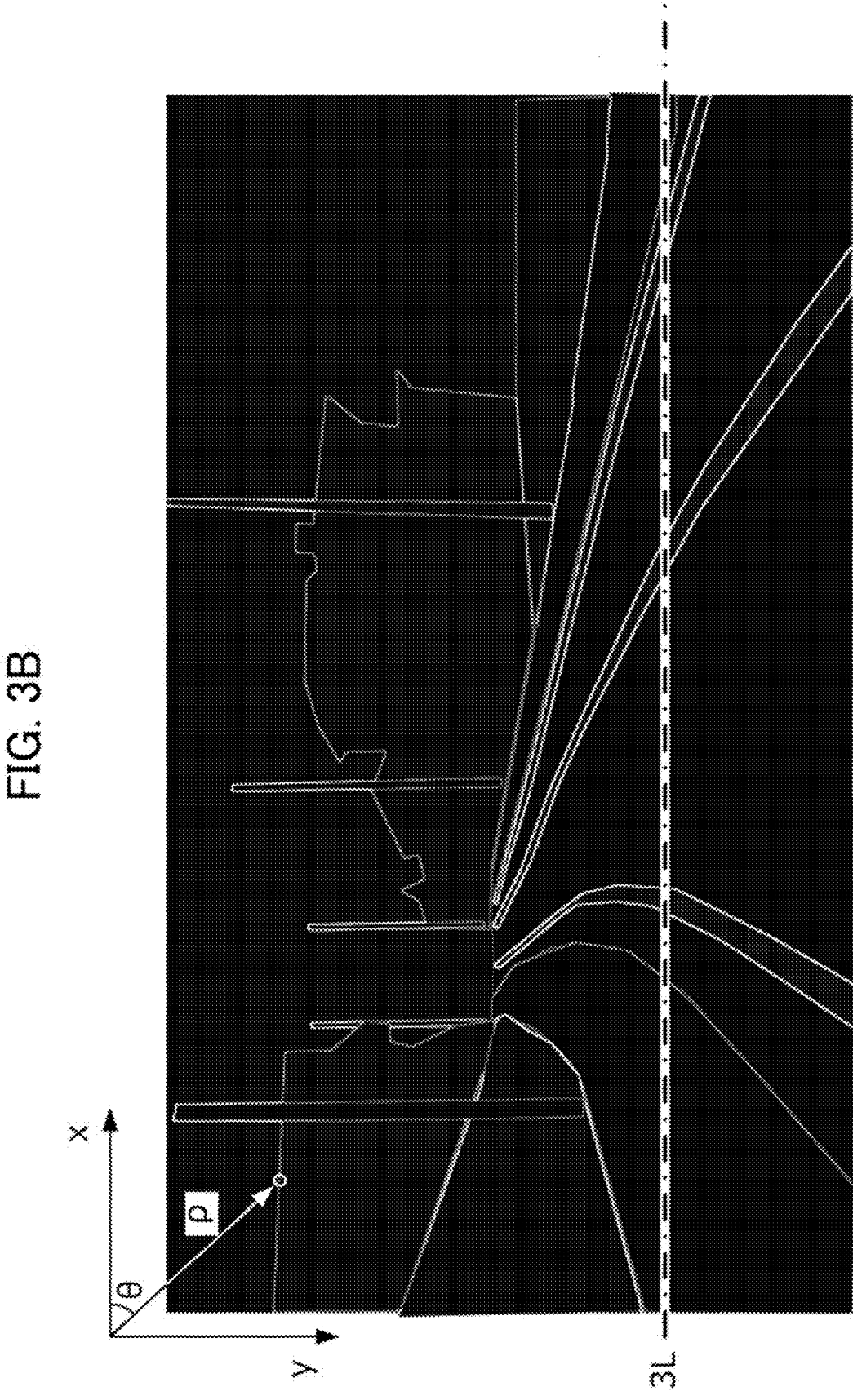
FIG. 3B is a view illustrating an example of an edge image generated from the front scene image.

FIG. 3A is a view illustrating an example when a plurality of classes extracted through the processing in the classifier 50 from a front scene image are colored, and FIG. 3B is a view illustrating an example of an edge image generated through the processing in the classifier 50 from the front scene image.

As illustrated in FIG. 3A, the classifier 50 is able to classify photographic objects seen in a front scene image into a plurality of classes including, for example, an own vehicle division line, a division line of a next lane, a median strip, a white line, a curbstone, a sidewalk, a wall, a residential building, a utility pole, a building, a planting, a motor vehicle, bicycle, a pedestrian, and a building structure. Furthermore, as illustrated in FIG. 3B, the classifier 50 is able to generate an edge image including edges of the classes included in the front scene image. Note that an edge of a class classified into an own vehicle division line by the classifier 50 will be hereinafter also referred to as an "own vehicle division line edge".

Returning to FIG. 2, the parallel edge extractor 51 extracts, from the edge image generated by the classifier 50, the edges of the classes classified into the own vehicle division line by the classifier 50 (hereinafter also referred to as the "own vehicle division line edge") and a plurality of edges that are parallel to the own vehicle division line edge when a field of view of the on-vehicle front camera 4 is seen in a plan view (hereinafter also referred to as "parallel edges") for the classes extracted from the front scene image by the classifier 50. In other words, the parallel edge extractor 51 extracts, as the parallel edges, the plurality of edges extending toward a vanishing range centered around a vanishing point that is common to the own vehicle division line edge in the edge image.

A procedure of extracting a plurality of parallel edges that are parallel in a plan view to an own vehicle division line edge in an edge image in the parallel edge extractor 51 will now be described herein with reference to FIGS. 4A to 4B.

The parallel edge extractor 51 first performs known Hough transformation processing on an edge image generated by the classifier 50 to extract linear elements from a plurality of edges forming the edge image.

Figure 4A:
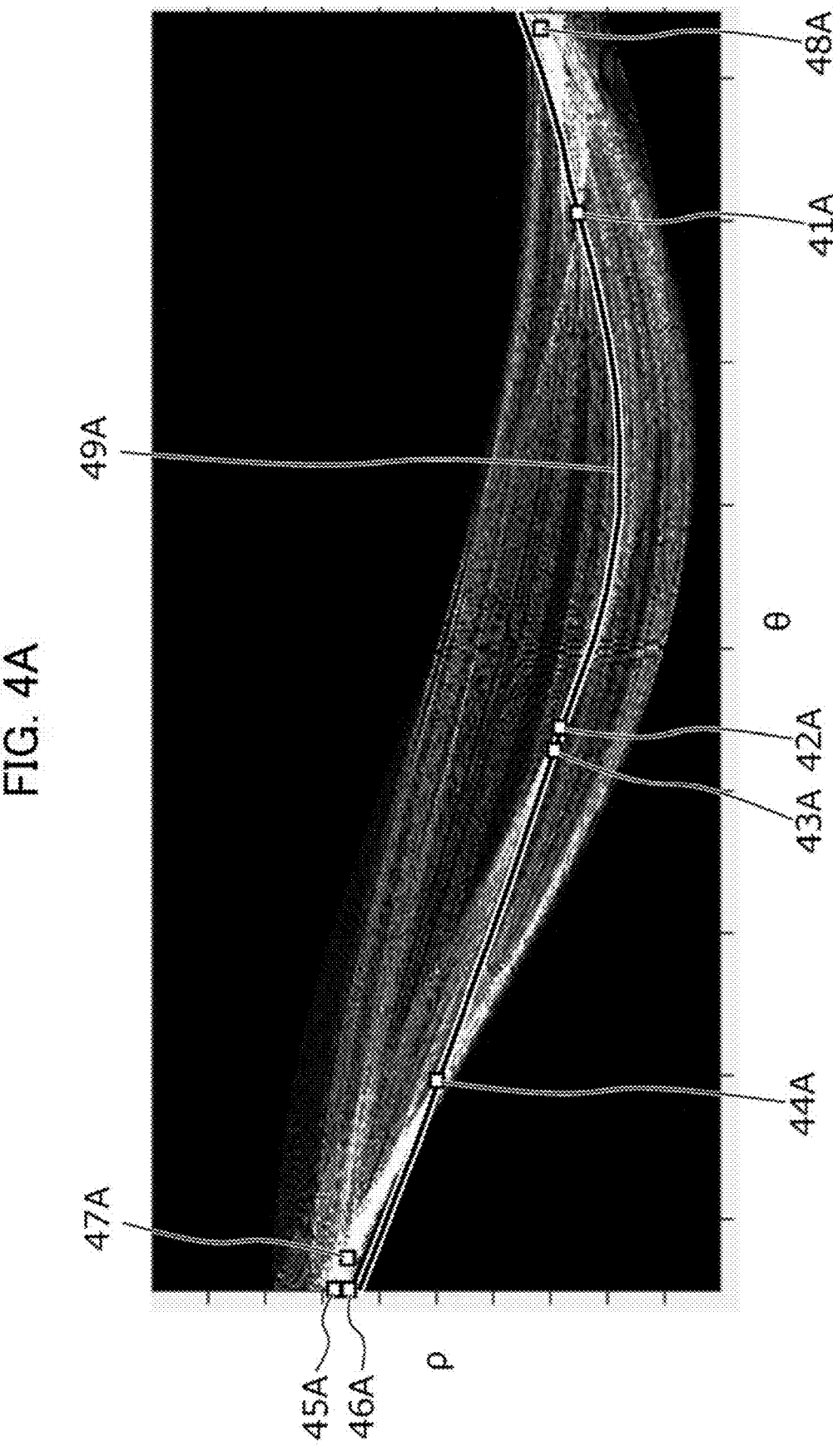
FIG. 4A is a view acquired by converting pixels forming the edge image illustrated in FIG. 3B into lines in a parameter space.

FIG. 4A is a view acquired by converting pixels forming the edge image illustrated in FIG. 3B into lines in a parameter space in which a horizontal axis represents angle ($\theta$) and a vertical axis represents radius ($\rho$). In the Hough transformation processing, points in an image space, which are represented by coordinates (x, y), are projected to form a sinusoidal wave line in the parameter space as illustrated in FIG. 4A. Therefore, the linear elements in the image space are represented as points at which a plurality of lines are overlapping with each other in the parameter space (brighter points in the example illustrated in FIG. 4A, which are indicated by points 41A to 48A each having a square shape).

Figure 4B:
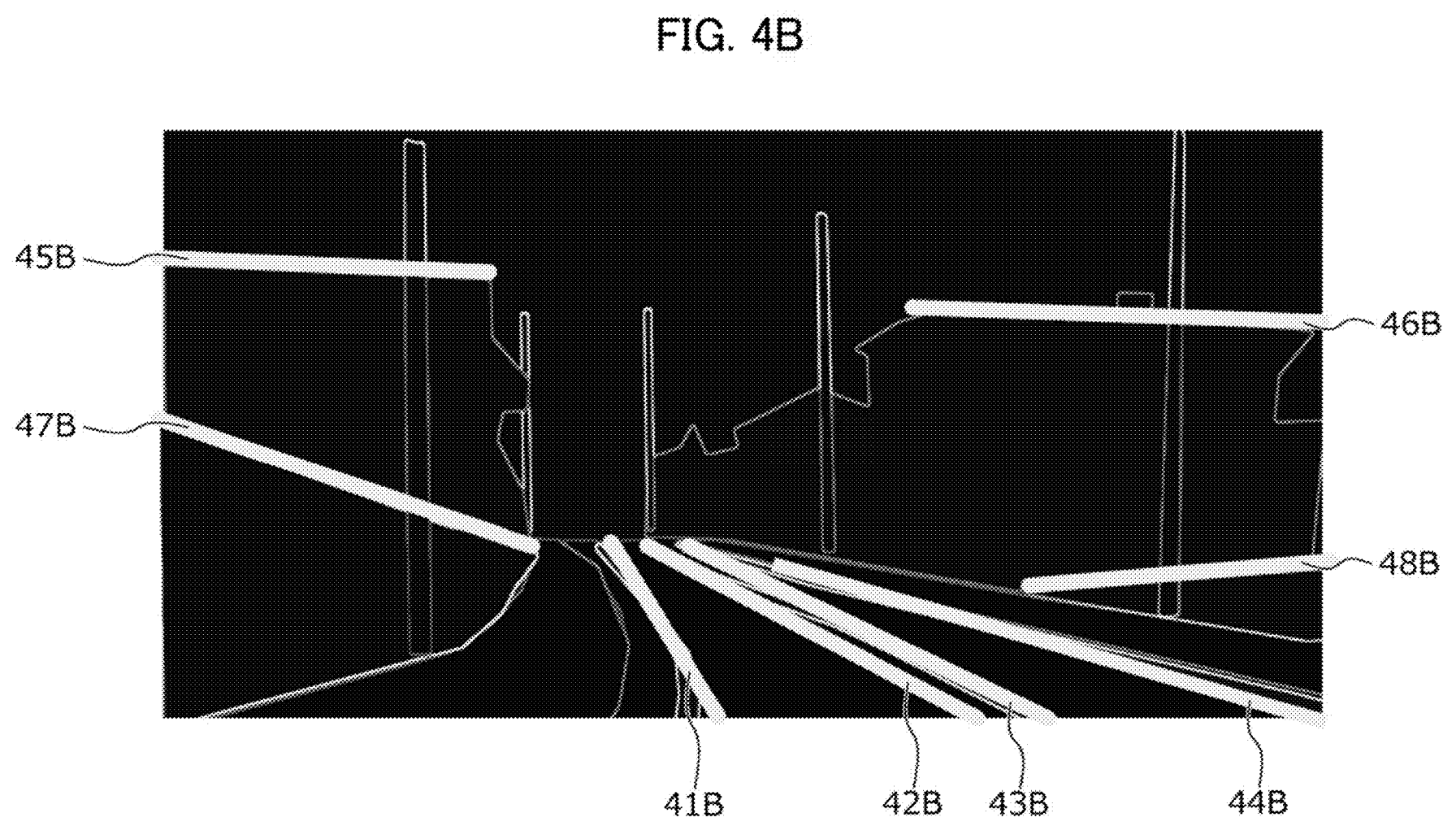

FIG. 4B is a view in which some of straight lines extracted from the parameter space illustrated in FIG. 4A are highlighted. In FIG. 4B, only eight straight lines are illustrated as bold lines. Note that, in the example illustrated in FIG. 4B, eight points 41A, 42A, 43A, 44A, 45A, 46A, 47A, 48A in the parameter space are respectively indicated as lines 41B, 42B, 43B, 44B, 45B, 46B, 47B, 48B. Note that, in FIG. 4B, the line 41B represents a left own vehicle division line, and the line 42B represents a right own vehicle division line. Note that, in below description with reference to FIGS. 4A and 4B, a lower side below a line 3L in the edge image illustrated in FIG. 3B is trimmed for ease of understanding to allow the own vehicle division lines 41B, 42B to be straight lines also in the edge image.

Among the eight lines 41B to 48B, as illustrated in FIG. 4B, the four lines 41B to 44B are parallel to each other with respect to the own vehicle division lines 41B, 42B in a plan view, and the four lines 45B to 48B are not parallel to the own vehicle division lines 41B, 42B in a plan view. As illustrated in FIG. 4B, the four lines 41B to 44B that are parallel to the own vehicle division line edges in a plan view extend toward a vanishing point that is common to the own vehicle division line edges in the edge image. Therefore, the four points 41A to 44A in the parameter space, which respectively represent the four lines 41B to 44B, appear in the parameter space on one sinusoidal wave (see a line 49A in FIG. 4A) passing through the two points respectively representing the own vehicle division line edges. On the other hand, the four points 45A to 48A in the parameter space, which respectively represent the lines 45B to 48B that are not parallel to the own vehicle division line edges in a plan view, appear in the parameter space at positions away from the line 49A in the form of the sinusoidal wave described above.

Since Hough transformation presents such characteristics as described above, the parallel edge extractor 51 extracts the edges with peaks appearing within a predetermined width centered around one sinusoidal wave (see the line 49A in FIG. 4A) passing through the two peaks representing the own vehicle division line edges on a Hough plane in the plurality of edges forming the edge image as parallel edges. Thereby, the parallel edge extractor 51 is able to extract the plurality of edges extending toward a vanishing range centered around a vanishing point that is common to the own vehicle division line edges in the edge image as parallel edges.

Returning to FIG. 2, the parallel edge extractor 51 uses the procedure as described above to extract the own vehicle division line edges and the plurality of parallel edges with respect to the own vehicle division line edges from the edge image, and, furthermore, selects one of the extracted plurality of parallel edges as a reference edge. More specifically, the parallel edge extractor 51 may preferably select one parallel edge, the class of which is recognized by the classifier 50 continuously for a longer period of time as much as possible while the vehicle V is traveling, such as a median strip or a curbstone, from the plurality of parallel edges as a reference edge. Furthermore, the other parallel edges than the reference edge in the plurality of parallel edges extracted by the parallel edge extractor 51 will be hereinafter referred to as comparison edges.

Furthermore, the parallel edge extractor 51 transmits, to the feature ratio parameter calculator 52, information related to positions, orientations, and lengths of the line segments, for example, in the edge image, of the own vehicle division line edges, the reference edge, and the plurality of comparison edges, which are extracted through the procedure as described above (hereinafter also referred to as "edge position information").

The feature ratio parameter calculator 52 calculates, based on the edge position information of the own vehicle division line edges, the reference edge, and the plurality of comparison edges, which are extracted by the parallel edge extractor 51, a value of a feature ratio defined as described below for each of the own vehicle division line edges, the reference edge, and the plurality of comparison edges.

Figure 5:
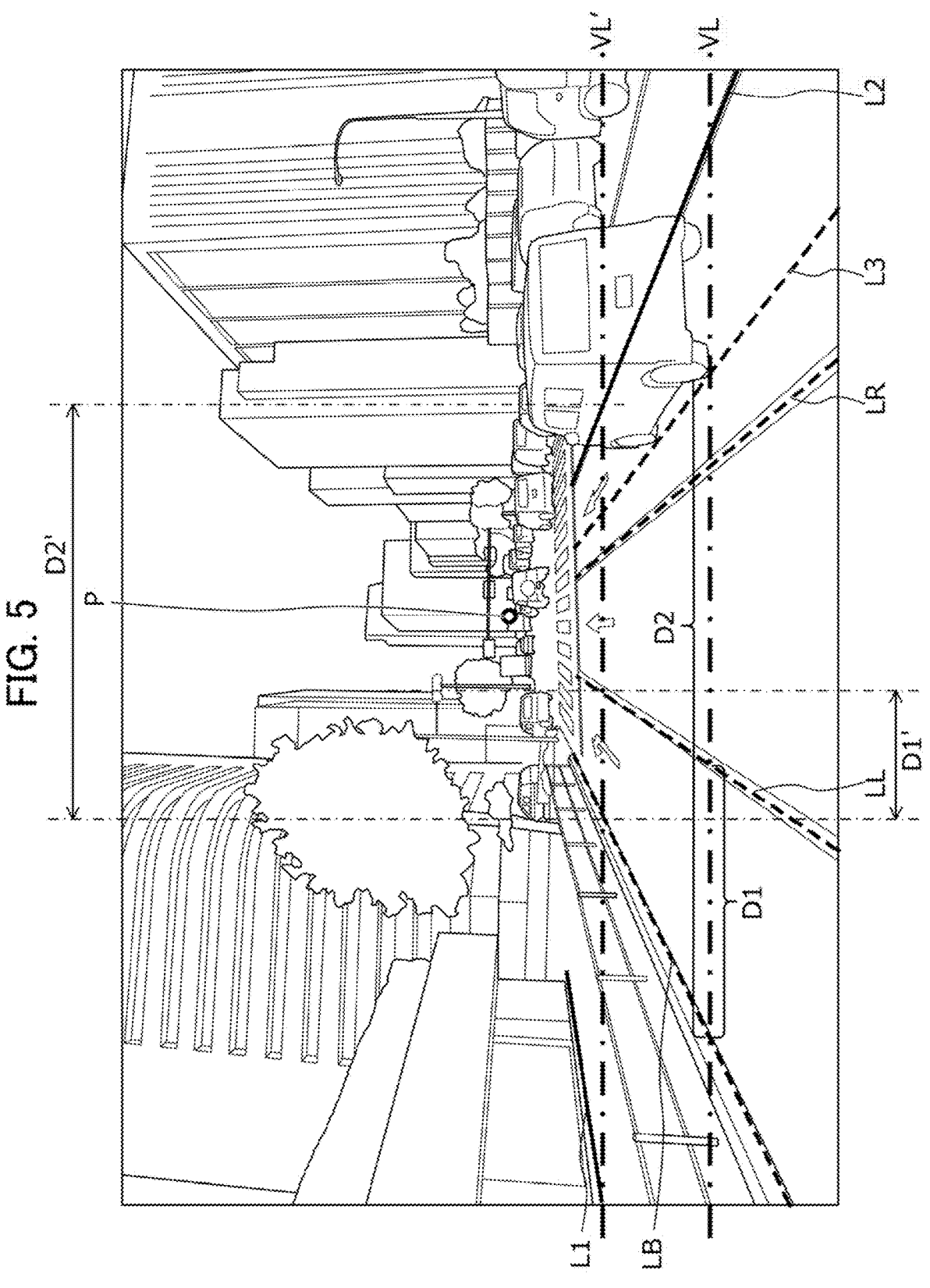
FIG. 5 is a view in which own vehicle division line edges, a reference edge, and comparison edges, which are extracted by a parallel edge extractor, are illustrated in the front scene image in an overlapped manner.

FIG. 5 is a view in which a left own vehicle division line edge LL, a right own vehicle division line edge LR, a reference edge LB, a first comparison edge L1, a second comparison edge L2, and a third comparison edge L3, which are extracted by the parallel edge extractor 51, are illustrated in the front scene image from which the edges are extracted in an overlapped manner.

FIG. 5 illustrates a case where, in a region in which left side traveling is designated, the vehicle V travels on a travel path, that is, a second lane from a left side. Furthermore, FIG. 5 illustrates a case where an edge of a curbstone existing closer to the left side of the vehicle V than the left own vehicle division line edge LL serves as the reference edge LB, an edge of a building structure standing along a sidewalk extending closer to the left side than the reference edge LB serves as the first comparison edge L1, an edge of a division line dividing a next lane on the right side of the travel path of the vehicle V serves as the second comparison edge L2, and an edge formed by a vehicle column of one or more vehicles traveling on the next lane on the right side serves as the third comparison edge L3.

As illustrated in FIG. 5, the feature ratio parameter calculator 52 sets a horizontal reference line VL extending in width directions on a lower side than a vanishing point P that is common to the plurality of edges LL, LR, LB, L1 to L3 in the front scene image in a virtual manner, and calculates a distance along the horizontal reference line VL from the reference edge LB to each of the own vehicle division line edges LL, LB and the comparison edges L1 to L3. More specifically, the feature ratio parameter calculator 52 calculates a distance along the horizontal reference line VL between the reference edge LB and each of the own vehicle division line edges LL, LR (hereinafter referred to as an "own vehicle division line distance"), a distance along the horizontal reference line VL between the reference edge LB and each of the comparison edges L1, L2, L3 (hereinafter referred to as a "comparison distance"), and a value of a feature ratio (=own vehicle division line distance/comparison distance) between the comparison distance and the own vehicle division line distance. Note that, in the present invention, for example, a feature ratio defined as described above or a parameter correlated to the feature ratio (that is, a combination of an own vehicle division line distance and a comparison distance, for example) is referred to as a feature ratio parameter.

Note herein that, as illustrated in FIG. 5, a horizontal reference line VL' that is parallel to the horizontal reference line VL is set between the horizontal reference line VL and the vanishing point P, that is, at a position farther from the vehicle V than the horizontal reference line VL in the depth direction in the front scene image. In this case, a similarity relationship is established between each of triangles where intersection points with the plurality of edges LL, LR, LB, L1 to L3 with respect to the horizontal reference line VL and the vanishing point P serve as apexes and each of triangles where intersection points with the plurality of edges LL, LR, LB, L1 to L3 with respect to the horizontal reference line VL' and the vanishing point P serve as apexes. Therefore, for example, a feature ratio (D1/D2) between a comparison distance (in FIG. 5, "D2") along the horizontal reference line VL between the reference edge LB and the third comparison edge L3 and an own vehicle division line distance (in FIG. 5, "D1") along the horizontal reference line VL between the reference edge LB and the left own vehicle division line LL is equal to a feature ratio (D1'/D2') between a comparison distance (in FIG. 5, "D2'") along the horizontal reference line VL' between the reference edge LB and the third comparison edge L3 and an own vehicle division line distance (in FIG. 5, "D1'") along the horizontal reference line VL' between the reference edge LB and the left own vehicle division line LL. Note that a similar or identical relationship is established with respect to a feature ratio defined with respect to the right own vehicle division line LB. That is, with respect to a feature ratio that is a ratio between a comparison distance and an own vehicle division line distance defined as described above, a substantially constant geometrical relationship is established regardless of a position in a depth direction of a horizontal reference line in a front scene image. That is, this means that, even when it is impossible to recognize existence of an own vehicle division line from a front scene image acquired at a certain time, it is possible to estimate a position of an own vehicle division line at the certain time from positions of a reference edge and at least one comparison edge at the certain time and a value of a feature ratio at a time earlier than the certain time.

Returning to FIG. 2, the storage unit 53 stores time-series data of values of feature ratio parameters (that is, feature ratios or combinations of comparison distances and own vehicle division line distances, for example), each of which are calculated for each of front scene images by the classifier 50, the parallel edge extractor 51, and the feature ratio parameter calculator 52 with the procedure as described above. Thereby, in the own vehicle division line estimator 54 described later, it is possible to read and acquire a value of a feature ratio parameter at a time earlier than a certain time from the storage unit 53.

The own vehicle division line estimator 54 estimates, based on position information of the reference edge and the comparison edges extracted by the parallel edge extractor 51 at the current time and a value of a feature ratio parameter at a time earlier than the current time, the value being stored in the storage unit 53, a position of an own vehicle division line at the current time. More specifically, the own vehicle division line estimator 54 estimates a position of an own vehicle division line at the current time to allow the value of the feature ratio at the current time and the value of the feature ratio at a time earlier than the current time, the value being stored in the storage unit 53, to be equal to each other. That is, this estimation corresponds to estimation that, when a distance along a horizontal reference line between a reference edge and a comparison edge at the current time is designated as "a" and a value of a feature ratio at a time earlier than the current time is designated as "r", an own vehicle division line at the current time exists at a position away by a distance "a×r" along the horizontal reference line from the reference edge at the current time.

FIG. 6 is a view illustrating an example of time-series data of values of feature ratio parameters, which is stored in the storage unit 53. FIG. 6 illustrates an example of the time-series data of the values of the feature ratio parameters when the plurality of edges LL, LR, LB, L1 to L3 described with reference to FIG. 5 are recognized by the parallel edge extractor 51. Furthermore, FIG. 6 illustrates a case where the current time is designated as "n" and the values of the feature ratio parameters at times "n-1", "n-2", "n-3", "n-4", and "n-5" at five points earlier than the current time are stored in the storage unit 53. Furthermore, FIG. 6 illustrates a case where distances from the reference edge to the edges LL, LR, LB, L1 to L3 are stored as feature ratio parameters. Therefore, when the second comparison edge at the time "n-5" is used, for example, a feature ratio with respect to the left own vehicle division line edge at the time "n-5" is expressed as "D_LL(n-5)/D_L2(n-5)" and a feature ratio with respect to the right own vehicle division line edge at the time "n-5" is expressed as "D_LR(n-5)/D_L2(n-5)".

Furthermore, FIG. 6 illustrates a case where, at the time "n-2" and later times, it has been impossible to recognize the first comparison edge, and, at the current time "n", it has been impossible to recognize the left own vehicle division line edge, the right own vehicle division line edge, the first comparison edge, and the third comparison edge.

In the example illustrated in FIG. 6, the own vehicle division line estimator 54 is able to estimate positions of the left own vehicle division line edge and the right own vehicle division line edge based on the distance "D_L2(n-1)" along the horizontal reference line between the reference edge and the second comparison edge at the current time "n" and the values of the feature ratio parameters at the times "n-1", "n-2", "n-3", "n-4", and "n-5" earlier than the current time, the values being stored in the storage unit 53. More specifically, when the values of the feature ratio parameters at the time "n-1" are used, for example, the own vehicle division line estimator 54 is able to estimate that the left own vehicle division line edge exists at a position away by "D_L2(n)×D_LL(n-1)/D_L2(n-1)" along the horizontal reference line from the reference edge at the current time and is able to estimate that the right own vehicle division line edge exists at a position away by "D_L2(n)×D_LR(n-1)/D_L2 (n-1)" along the horizontal reference line from the reference edge at the current time. Furthermore, when the values of the feature ratio parameters at the time "n-5" are used, for example, the own vehicle division line estimator 54 is able to estimate that the left own vehicle division line edge exists at a position away by "D_L2(n)×D_LL(n-5)/D_L2 (n-5)" along the horizontal reference line from the reference edge at the current time and is able to estimate that the right own vehicle division line edge exists at a position away by "D_L2(n)×D_LR (n-5)/D_L2(n-5)" along the horizontal reference line from the reference edge at the current time. Furthermore, the own vehicle division line estimator 54 may average distances estimated based on the values of the feature ratio parameters at the times "n-1", "n-2", "n-3", "n-4", and "n-5" to estimate a position of an own vehicle division line.

Furthermore, in FIG. 6, although it has been described the case where the feature ratio parameter calculator 52 sets one horizontal reference line with respect to one front scene image (or one edge image), calculates an own vehicle division line distance and a comparison distance along the horizontal reference line as feature ratio parameters, and causes the storage unit 53 to store the parameters, the present invention is not limited to the case. The feature ratio parameter calculator 52 may set a plurality of horizontal reference lines with respect to one front scene image (or one edge image), may calculate an average of own vehicle division line distances and an average of comparison distances along the plurality of horizontal reference lines as feature ratio parameters, and may cause the storage unit 53 to store the parameters.

Figure 7:
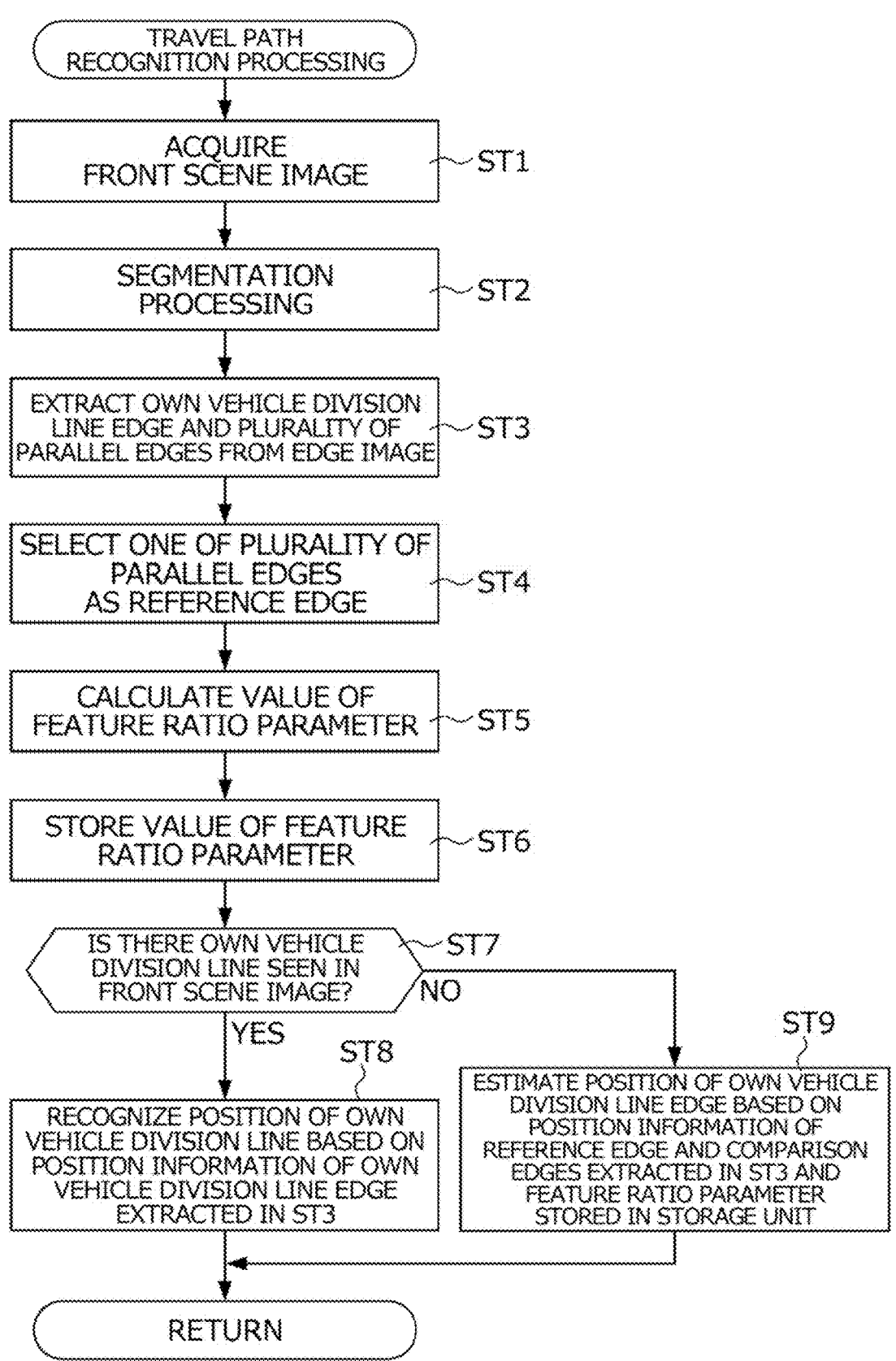
FIG. 7 is a flowchart illustrating a specific procedure of travel path recognition processing.

FIG. 7 is a flowchart illustrating a specific procedure of the travel path recognition processing of recognizing a travel path of the vehicle V by the outside recognition system 3 as described above. The travel path recognition processing illustrated in FIG. 7 is repeatedly executed at predetermined control cycles in the travel path recognizer 5 while the vehicle V is traveling.

In step ST1, the travel path recognizer 5 first acquires a front scene image of the vehicle V, which is captured by the on-vehicle front camera 4, and allows the processing to proceed to step ST2.

Next, in step ST2, the travel path recognizer 5 performs segmentation processing on the front scene image acquired in step ST1, classifies photographic objects in the front scene image into a plurality of classes including an own vehicle division line, and generates an edge image in which edges of the classes are extracted, and allows the processing to proceed to step ST3.

Next, in step ST3, the travel path recognizer 5 extracts, from the edge image generated in step ST2 for the classes, own vehicle division line edges and a plurality of parallel edges that are parallel to the own vehicle division line edges in a plan view, and allows the processing to proceed to step ST4.

Next, in step ST4, the travel path recognizer 5 selects one of the plurality of parallel edges extracted in step ST3 as a reference edge, and allows the processing to proceed to step ST5. Note that the other edges than the reference edge in the plurality of parallel edges will be hereinafter referred to as comparison edges.

Next, in step ST5, the travel path recognizer 5 uses position information of the own vehicle division line edges, the reference edge, and the plurality of comparison edges, which are extracted in steps ST3 to ST4, to calculate a value of a feature ratio parameter with respect to each of the own vehicle division line edges (that is, a comparison distance (a distance between the reference edge and each of the comparison edges) and an own vehicle division line distance (a distance between the reference edge and each of the own vehicle division line edges) along a horizontal reference line or a feature ratio between each of the comparison distances and each of the own vehicle division line distances), and allows the processing to proceed to step ST6.

In step ST6, the travel path recognizer 5 causes the storage unit 53 to store the value of the feature ratio parameter, the value being calculated in step ST5, and allows the processing to proceed to step ST7.

In step ST7, the travel path recognizer 5 determines whether or not photographic objects classified into own vehicle division lines are seen in the front scene image acquired in the control cycle at this time (that is, the current time), in other words, whether or not it has been possible to extract own vehicle division line edges from the edge image in step ST3 executed in the control cycle at this time.

The travel path recognizer 5 allows the processing to proceed to step ST8 when a result of the determination in step ST7 is YES, that is, it is possible to recognize own vehicle division lines from the front scene image acquired in the control cycle at this time. In step ST8, the travel path recognizer 5 recognizes positions of the own vehicle division lines based on position information of the own vehicle division line edges that have been possible to be extracted from the edge image in step ST3 executed in the control cycle at this time, and ends the travel path recognition processing illustrated in FIG. 7.

On the other hand, the travel path recognizer 5 allows the processing to proceed to step ST9 when the result of the determination in step ST7 is NO, that is, it has been impossible to recognize own vehicle division lines from the front scene image acquired in the control cycle at this time. In step ST9, the travel path recognizer 5 estimates positions of own vehicle division lines based on the position information of the reference edge and the comparison edges extracted from the edge image in steps ST3 to ST4 executed in the control cycle at this time and the values of the feature ratio parameters, the values being stored in the storage unit 53 in step ST6 executed in the control cycles at a previous time and before, and ends the travel path recognition processing illustrated in FIG. 7.

Returning to FIG. 1, the controller 2 is a computer configured based on hardware including, for example, an arithmetic processor such as a CPU, an auxiliary storage such as an HDD or an SSD that stores various types of programs, and a main storage including a RAM that stores data temporarily required for the arithmetic processor to execute the programs. The controller 2 controls at least one of the electric power steering device 9, the power plant 8, or the braking device 7 based on a result of the recognition with respect to a travel path of the vehicle V by the outside recognition system 3 as described above.

More specifically, the controller 2 controls, when there is a photographic object classified into an own vehicle division line seen in the front scene image, that is, when a result of the determination in step ST7 in the processing illustrated in FIG. 7 is YES, at least one of the electric power steering device 9, the power plant 8, or the braking device 7 based on position information of the own vehicle division lines extracted by the parallel edge extractor 51 (that is, a result of the recognition in step ST8 in the processing).

Furthermore, the controller 2 controls, when no photographic object classified into an own vehicle division line is seen in the front scene image, that is, when the result of the determination in step ST7 in the processing illustrated in FIG. 7 is NO, at least one of the electric power steering device 9, the power plant 8, or the braking device 7 based on position information of the own vehicle division lines estimated by the own vehicle division line estimator 54 (that is, a result of the estimation in step ST9 in the processing).

With the outside recognition system 3 and the vehicle controller 1 according to the present embodiment, effects described below are achieved.

(1) The classifier 50 performs segmentation processing on a front scene image of the vehicle V to classify photographic objects in the front scene image into a plurality of classes (including an own vehicle division line), and to generate an edge image in which edges of the classes are extracted. The parallel edge extractor 51 extracts an own vehicle division line edge and a plurality of parallel edges that are parallel to the own vehicle division line edge in a plan view from the edge image, and selects one of the plurality of parallel edges as a reference edge. The feature ratio parameter calculator 52 calculates a value of a feature ratio parameter correlated to a feature ratio between a comparison distance (a distance between the reference edge and each of comparison edges) and an own vehicle division line distance (a distance between the reference edge and the own vehicle division line edge) along a horizontal reference line, and the storage unit 53 stores a value of the feature ratio parameter, the value being calculated by the feature ratio parameter calculator 52 at a time earlier than the current time. Furthermore, the own vehicle division line estimator 54 utilizes the geometrical relationship with respect to the feature ratio between the comparison distance and the own vehicle division line distance, which is described with reference to FIG. 5, to estimate, based on position information of the reference edge and the comparison edges at the current time and the value of the feature ratio parameter at the time earlier than the current time, the value being stored in the storage unit 53, the position of the own vehicle division line at the current time. Therefore, with the outside recognition system 3, it is possible, even when there is no own vehicle division line seen in a front scene image, to allow existence of an own vehicle division line to be recognized, and, furthermore, to contribute to development of sustainable transportation systems.

(2) The parallel edge extractor 51 extracts, as the parallel edges, edges extending toward a vanishing range centered around a vanishing point that is common in the edge image. Thereby, it is possible to easily extract a plurality of parallel edges.

(3) The own vehicle division line estimator 54 estimates the position of the own vehicle division line at the current time to allow the value of the feature ratio at the current time and the value of the feature ratio, the value being calculated based on the value of the feature ratio parameter, the value being stored in the storage unit 53, to be equal to each other. Therefore, with the outside recognition system 3, it is possible to estimate a position of an own vehicle division line through simple arithmetic operation in the own vehicle division line estimator 54.

(4) The vehicle controller 1 includes: the outside recognition system 3 as described above; and the controller 2 that controls at least one of the electric power steering device 9, the power plant 8, or the braking device 7 in the vehicle V based on a result of the recognition by the outside recognition system 3. Furthermore, the controller 2 controls, when there is no photographic object classified into the own vehicle division line seen in the front scene image, at least one of the electric power steering device 9, the power plant 8, or the braking device 7 based on the position of the own vehicle division line, the position being estimated by the own vehicle division line estimator 54 in the outside recognition system 3. Therefore, with the vehicle controller 1, it is possible to continue control by the controller 2 even when there is no existing own vehicle division line during traveling.

Second Embodiment

Next, an outside recognition system according to a second embodiment of the present invention will now be described herein with reference to the accompanying drawings. Note that, in below descriptions, like reference numerals designate identical or corresponding components to those in the outside recognition system 3 according to the first embodiment, and their detailed descriptions are thus omitted.

Figure 8:
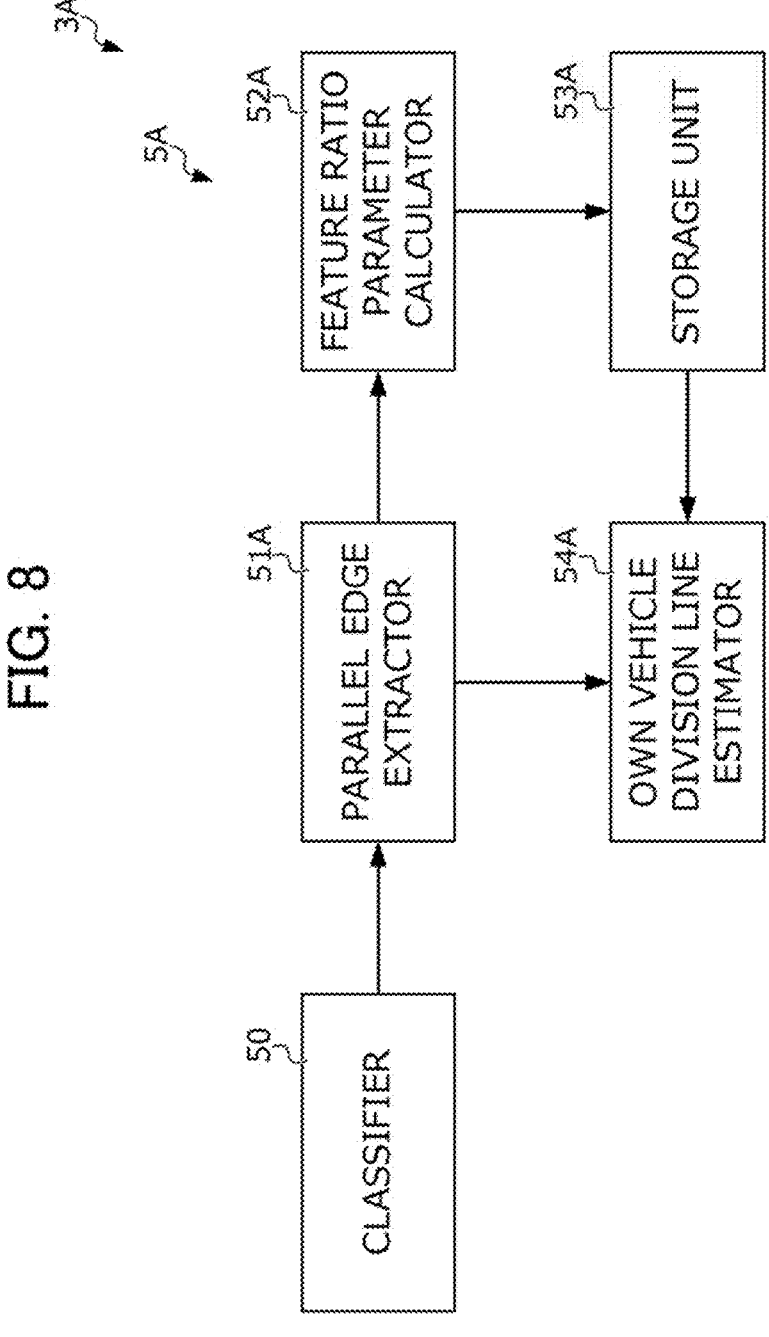
FIG. 8 is a functional block diagram of a travel path recognizer in an outside recognition system according to a second embodiment of the present invention.

FIG. 8 is a functional block diagram of a travel path recognizer 5A in an outside recognition system 3A according to the present embodiment.

Figure 9:
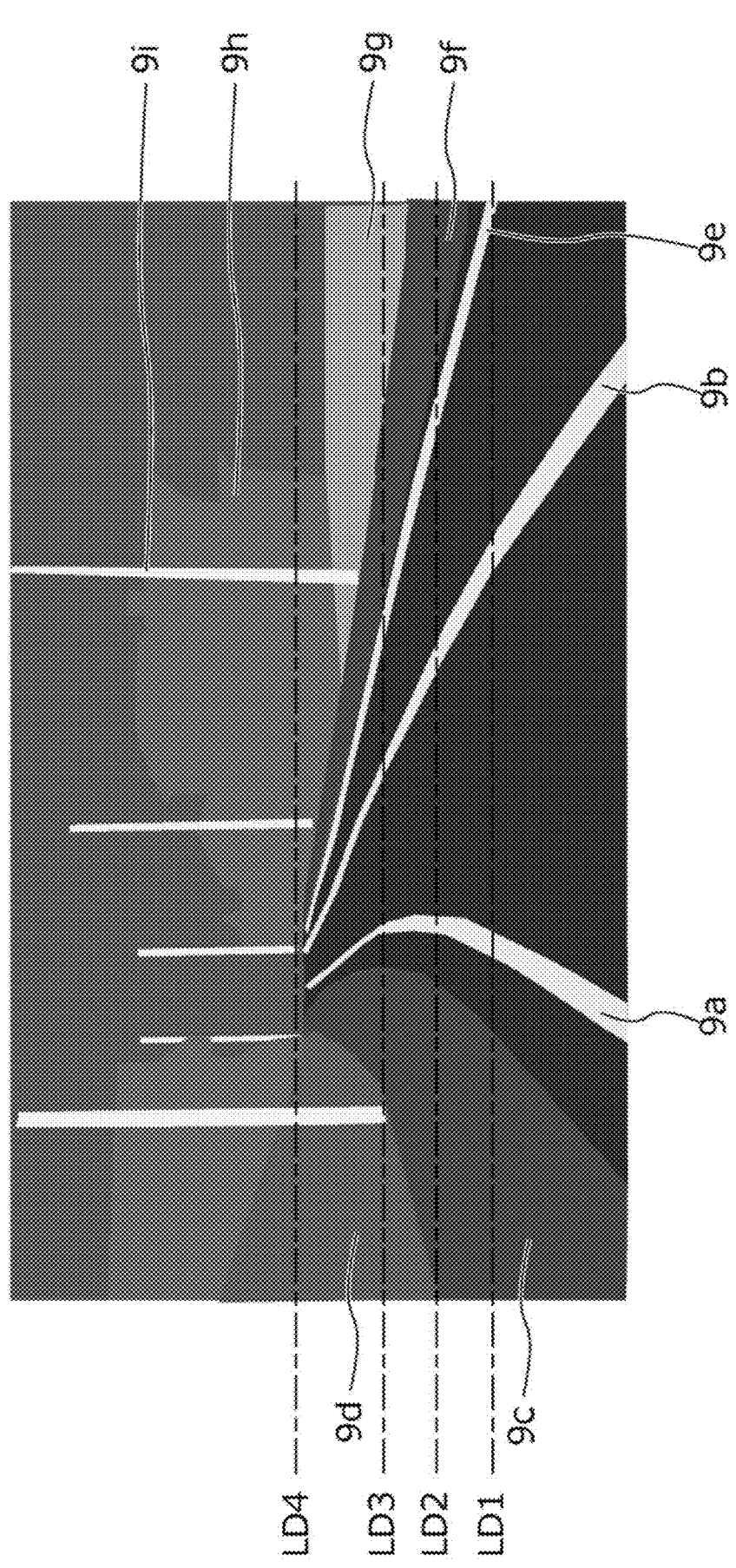
FIG. 9 is a view illustrating an example of an edge image generated through processing in a classifier.

FIG. 9 is a view illustrating an example of an edge image generated through processing in the classifier 50 in the travel path recognizer 5A according to the present embodiment. Note that FIG. 9 illustrates that photographic objects respectively recognized to be classified into different classes from each other by the classifier 50 are colored. A procedure of estimating a position of an own vehicle division line by the travel path recognizer 5A will now be described herein with reference to an example where a travel path is curbed toward the left side, as illustrated in FIG. 9A. Note that it is described below a case where the classifier 50 classifies a class 9a into a left own vehicle division line, classifies a class 9b into a right own vehicle division line (or a median strip), classifies a class 9c into a sidewalk extending along a roadway, classifies a class 9d into a wall extending along the sidewalk, classifies a class 9e into a division line of an opposite lane, classifies a class 9f into a sidewalk extending along the roadway, classifies a class 9g into an open space, classifies a class 9h into a residential building, and classifies a class 9i into a utility pole.

In the edge image as illustrated in FIG. 9, edges of the classes 9a, 9b representing the own vehicle division lines are parallel to edges of the other classes 9c to 9g when the field of view of the on-vehicle front camera is seen in a plan view. However, the edges of the classes 9a to 9g, which are parallel to each other in a plan view, are curved toward the left side as forward advancement in the advancing direction. Therefore, with the processing described in the first embodiment, it is difficult to extract the edges of the classes 9c to 9g as parallel edges that are parallel to the own vehicle division lines. On the other hand, a parallel edge extractor 51A according to the present embodiment follows a procedure described below to process an edge image to make it possible to extract a plurality of parallel edges that are parallel in a plan view with respect to curved own vehicle division lines as illustrated in FIG. 9.

The parallel edge extractor 51A first uses one or more section lines that is or are parallel to a horizontal reference line that is set when a value of a feature ratio parameter is calculated in a feature ratio parameter calculator 52A to partition, in a virtual manner, the edge image generated by the classifier 50 and edges existing in the edge image into a plurality of partition divisions and each into a plurality of edge line segments, respectively.

Figure 10:
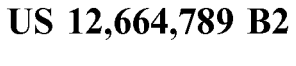
FIG. 10 is a view illustrating four partition divisions acquired by partitioning the edge image illustrated in FIG. 9 by four section lines.

FIG. 10 is a view illustrating four partition divisions, that is, a first partition division 101, a second partition division 102, a third partition division 103, and a fourth partition division 104, which are acquired by partitioning the edge image illustrated in FIG. 9 with four section lines, that is, a first section line LD1, a second section line LD2, a third section line LD3, and a fourth section line LD4. Note that, although it is described below, for example, a case where the parallel edge extractor 51A irregularly sets intervals for the four section lines LD1 to LD4, as illustrated in FIG. 10, the present invention is not limited to the case. It is sufficient that there be one or more section lines in number. Furthermore, intervals of a plurality of section lines may be equal intervals or may be set to be shorter for farther section lines from the vehicle V in the depth direction.

Next, the parallel edge extractor 51A extracts the edges each including edge line segments respectively extending toward vanishing ranges 101P, 102P, 103P, 104P designated for the partition divisions 101 to 104 partitioned as described above at a predetermined set count or more (in an example illustrated in FIG. 12 described later, for example, "3") in the plurality of edges included in the original edge image as parallel edges.

Figure 11:
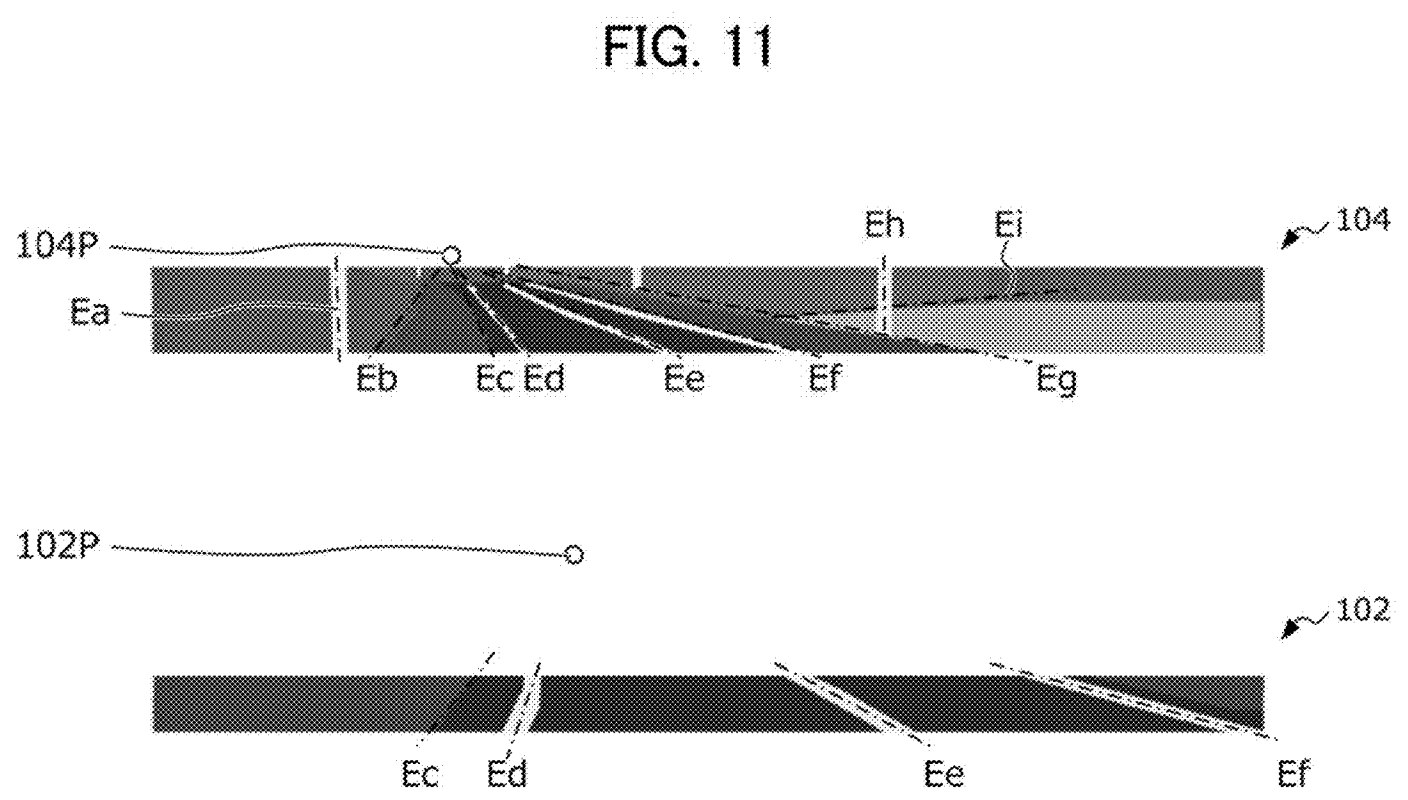

FIG. 11 is a view for describing a procedure of extracting a plurality of parallel edges in the parallel edge extractor 51A. FIG. 11 only illustrates the fourth partition division 104 and the third partition division 103 for ease of understanding. Furthermore, in FIG. 11, edge line segments of the class 9i classified into the utility pole are indicated by symbols Ea, Eh, an edge line segment of the class 9h classified into the residential building is indicated by a symbol Eb, an edge line segment of the class 9c classified into the sidewalk is indicated by a symbol Ec, an edge line segment of the class 9a classified into the left own vehicle division line is indicated by a symbol Ed, an edge line segment of the class 9b classified into the right own vehicle division line is indicated by a symbol Ee, an edge line segment of the class 9e classified into the division line of the opposite lane is indicated by a symbol Ef, an edge line segment of the class 9f classified into the sidewalk is indicated by a symbol Eg, and an edge line segment of the class 9g classified into the open space is indicated by a symbol Ei.

In the fourth partition division 104, as illustrated in FIG. 11, the three edge line segments Ea, Eh, Ei do not extend toward the vanishing range 104P. Furthermore, in the fourth partition division 104, the six edge line segments Eb, Ec, Ed, Ee, Ef, Eg extend toward the vanishing range 104P. In the second partition division 102, on the other hand, the five edge line segments Ea, Eb, Eg, Eh, Ei that exist in the fourth partition division 104 do not exist. Furthermore, in the second partition division 102, the four edge line segments Ec, Ed, Ee, Ef extend toward the vanishing range 102P.

FIG. 12 is a view illustrating an example of a result when the parallel edge extractor 51A has evaluated the plurality of edge line segments included in the four partition divisions

101 to 104 as illustrated in FIG. 10. Note that, in FIG. 12, a mark "x" is added for an edge line segment that does not exist in a target partition division, a mark "Δ" is added for an edge line segment that does not extend toward a vanishing range designated for each of the partition divisions, and a mark "◯" is added for an edge line segment that extends toward the vanishing range designated for each of the partition divisions.

As illustrated in FIG. 12, the edge Ec includes the four edge line segments each extending toward the vanishing range designated for each of the partition divisions, the edge Ef includes the three edge line segments each extending toward the vanishing range, the edges Eb, Eg each include one edge line segment extending toward the vanishing range, and the edges Ea, Eh, Ei each include no edge line segment extending toward the vanishing range. Therefore, when the set count is set to "3" in the example illustrated in FIG. 12, the parallel edge extractor 51A extracts two edges, that is, the edges Ec, Ef, as parallel edges. Note that a procedure of extracting an edge line segment extending from each of the partition divisions 101 to 104 toward each designated vanishing range is similar or identical to that according to the first embodiment, and its detailed description is thus omitted.

The parallel edge extractor 51A uses, after the plurality of parallel edges are extracted from the edge image through the procedure as described above, a procedure similar or identical to that according to the first embodiment to select one of the plurality of parallel edges as a reference edge, and to designate the others as comparison edges.

Returning to FIG. 8, the feature ratio parameter calculator 52A uses position information of the own vehicle division line edges, the reference edge, and the comparison edges, which are extracted through the procedure as described above by the parallel edge extractor 51A, to calculate a value of a feature ratio parameter defined similar or identical to that according to the first embodiment for each of the partition divisions.

As illustrated in FIG. 11, for example, a ratio between a distance along the horizontal reference line between the edges Ec, Ed and a distance along the horizontal reference line between the edges Ed, Ee in the fourth partition division 104 differs from a ratio between a distance along the horizontal reference line between the edges Ec, Ed and a distance along the horizontal reference line between the edges Ed, Ee in the second partition division 102. That is, when a travel path is curved, a geometrical relationship with respect to a feature ratio, as described in the first embodiment, is substantially established among common partition divisions, but is not established among different partition divisions. Then, the feature ratio parameter calculator 52A calculates a value of a feature ratio parameter for each of the partition divisions, as described above.

A storage unit 53A stores time-series data of values of feature ratio parameters, the values being calculated for each of the front scene images by the classifier 50, the parallel edge extractor 51A, and the feature ratio parameter calculator 52A through the procedure as described above, for each of the partition divisions, as illustrated in FIG. 13.

An own vehicle division line estimator 54A estimates, based on the values of the feature ratio parameters, the values being stored in the storage unit 53A for each of the partition divisions, a position of each of the own vehicle division lines at the current time for each of the partition divisions. Note that the procedure of estimating a position of an own vehicle division line in each partition division is similar or identical to that according to the first embodiment, and their detailed descriptions are thus omitted.

With the outside recognition system 3A according to the present embodiment, effects described below are achieved, in addition to the effects illustrated in (1) to (4) described above.

(5) The parallel edge extractor 51A uses one or more section lines that is or are parallel to the horizontal reference line to partition, in a virtual manner, the edges existing in the edge image each into a plurality of edge line segments, and extracts the edges each including edge line segments each extending toward the vanishing range designated for each of partition divisions divided in a virtual manner by the one or more section lines at a predetermined set count or more in the plurality of edges included in the edge image as the parallel edges. Therefore, with the outside recognition system 3A, it is possible to easily extract a plurality of parallel edges even when a travel path is curved.

(6) The feature ratio parameter calculator 52A calculates a value of the feature ratio parameter for each of the partition divisions, the storage unit 53A stores the value of the feature ratio parameter, the value being calculated by the feature ratio parameter calculator 52A, for each of the partition divisions, and the own vehicle division line estimator 54A estimates, based on the value of the feature ratio parameter, the value being stored in the storage unit 53A for each of the partition divisions, the position of the own vehicle division line at the current time for each of the partition divisions. Therefore, with the outside recognition system 3A, it is possible to easily estimate a position of an own vehicle division line even when a travel path is curved.

Note that, although it has been described the case where, in the second embodiment described above, the parallel edge extractor 51A uses one or more division lines to partition an edge image in a virtual manner to extract a plurality of parallel edges from the edge image, the present invention is not limited to the case.

Figure 14:
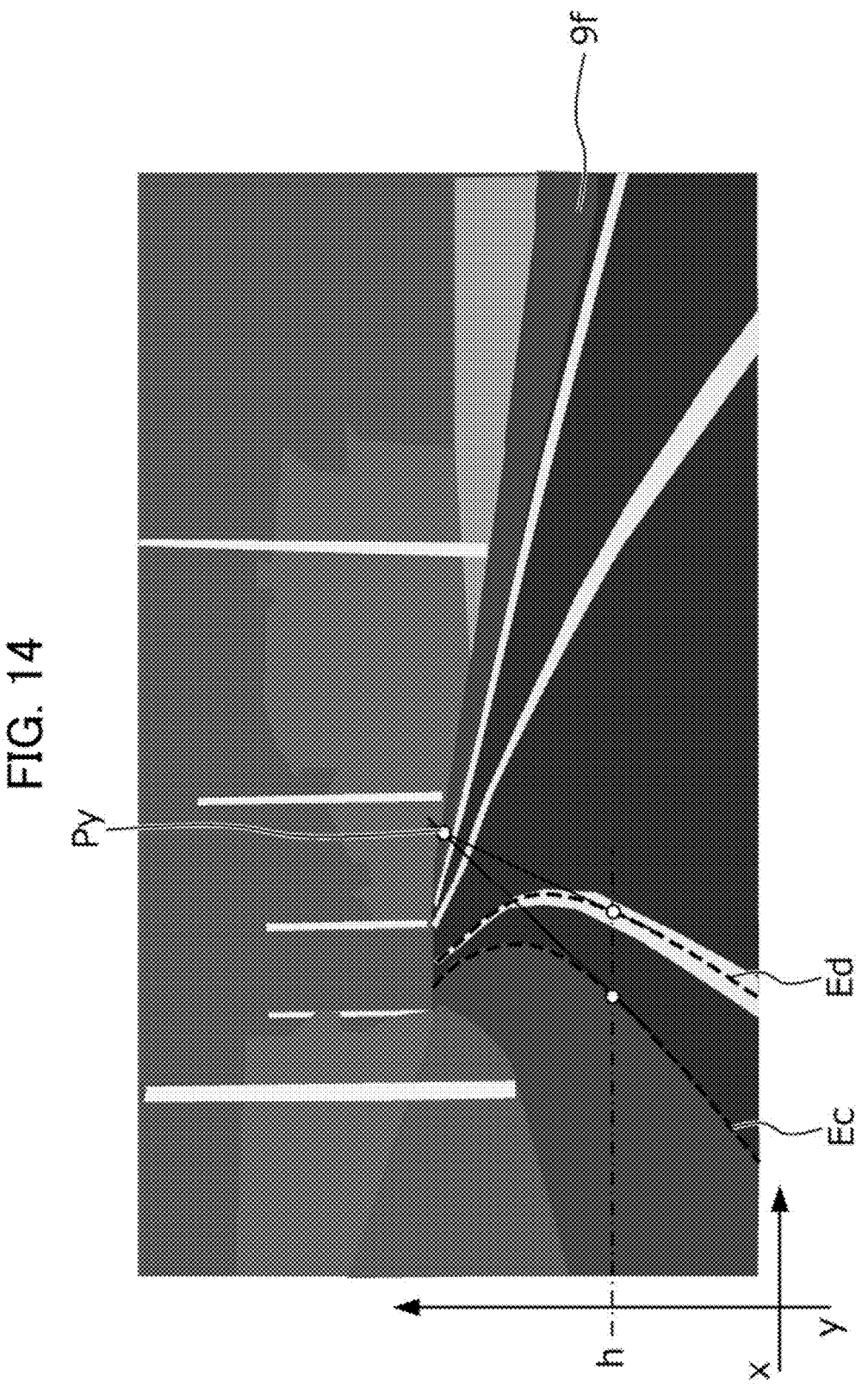
FIG. 14 is a view illustrating a procedure of extracting a plurality of parallel edges from the edge image by the parallel edge extractor, according to a modification example.

FIG. 14 is a view illustrating a procedure of extracting a plurality of parallel edges from an edge image by the parallel edge extractor, according to a modification example. As will be described below, an algorithm for causing the parallel edge extractor, according to the modification example, to extract a plurality of parallel edges from an edge image corresponds to one with which intervals of a plurality of section lines designated by the parallel edge extractor 51A according to the second embodiment are each shortened to minimum.

The parallel edge extractor according to the modification example expresses a position x in the width directions of each of a plurality of edges included in an edge image using a function of a position y in vertical directions. Note that FIG. 14 only illustrates two edges Ec, Ed. Furthermore, functions of the edges Ec, Ed will be designated below as fc(y), fd(y), respectively. In this case, as illustrated by solid lines in FIG. 14, inclinations of tangent lines of the edges Ec, Ed at points where the position y in the vertical directions is indicated as h are represented by derivative values fc'(h), fd'(h) of the functions fc(y), fd(y) described above. Furthermore, tangent lines of the plurality of edges that are parallel to each other in a plan view intersect with each other within a common vanishing range Py that differs per the position y in the vertical directions, as illustrated in FIG. 14. Therefore, when a plurality of edges included in an edge image are expressed by such functions as described above, evaluating the functions and their derivative values, for example, makes it possible to continuously evaluate whether or not a target edge is parallel, in the vertical directions, to an own vehicle division line edge in a plan view. Then, the parallel edge extractor according to the modification example evaluates the functions and their derivative values, for example, of the plurality of edges included in the edge image to extract a plurality of parallel edges that are parallel to the own vehicle division line in a plan view.

Third Embodiment

Next, an outside recognition system according to a third embodiment of the present invention will now be described herein with reference to the accompanying drawings. Note that, in below descriptions, like reference numerals designate identical or corresponding components to those in the outside recognition system 3 according to the first embodiment, and their detailed descriptions are thus omitted.

Figure 15:
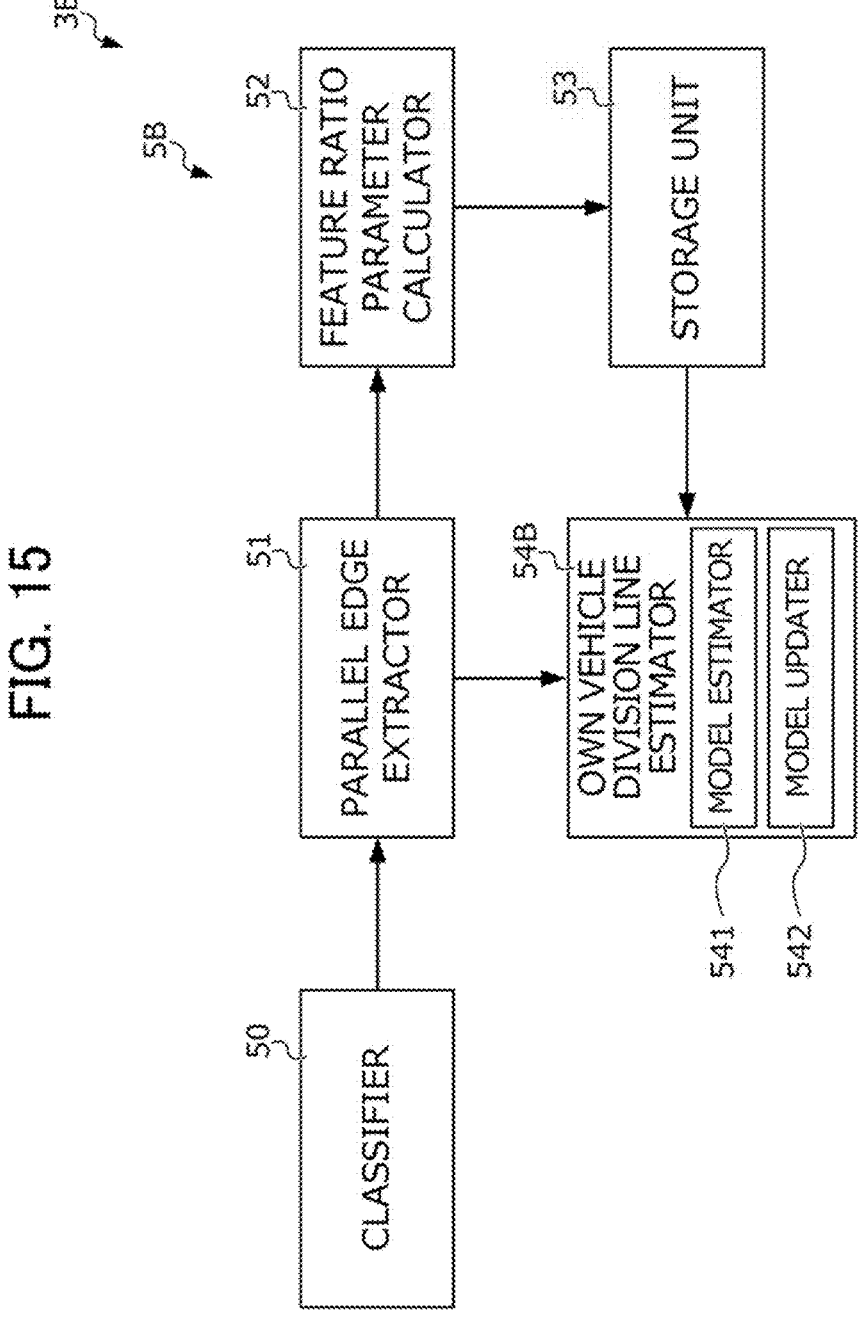
FIG. 15 is a functional block diagram of a travel path recognizer in an outside recognition system according to a third embodiment of the present invention.

FIG. 15 is a functional block diagram of a travel path recognizer 5B in an outside recognition system 3B according to the present embodiment. The travel path recognizer 5B according to the present embodiment differs from the travel path recognizer 5 according to the first embodiment in configuration in an own vehicle division line estimator 54B.

The own vehicle division line estimator 54B includes and uses a model estimator 541 and a model updater 542 to estimate a position of an own vehicle division line.

The model estimator 541 uses an own vehicle division line position estimation model causing position information of a reference edge and comparison edges to be associated with position information of own vehicle division lines to estimate a position of each of the own vehicle division lines at the current time. More specifically, the model estimator 541 uses a regression model in which position information of a reference edge and comparison edges at the current time serves as an explanatory variable and position information of own vehicle division lines at the current time serves as an objective variable or a neural network in which position information of a reference edge and comparison edges at the current time serves as an input and position information of own vehicle division lines at the current time serves as an output, as an own vehicle division line position estimation model, for example, to estimate a position of an own vehicle division line at the current time.

The model updater 542 updates the own vehicle division line position estimation model in the model estimator 541 based on a value of a feature ratio parameter at a time earlier than the current time, the value being stored in the storage unit 53. More specifically, the model updater 542 uses, as learning data, those calculated while all own vehicle division line edges, a reference edge, and comparison edges are extracted by the parallel edge extractor 51 in the time-series data of the values of the feature ratio parameters, which is stored in the storage unit 53, to update the own vehicle division line position estimation model.

With the outside recognition system 3B according to the present embodiment, effects described below are achieved, in addition to the effects illustrated in (1) to (4) described above.

(7) The model estimator 541 uses an own vehicle division line position estimation model causing the position information of the reference edge and the comparison edges to be associated with the position information of the own vehicle division lines to estimate the position of the own vehicle division line at the current time, and the model updater 542 updates the own vehicle division line position estimation model based on the value of the feature ratio parameter, the value being stored in the storage unit 53. Therefore, with the outside recognition system 3B, it is possible to update an input-and-output relationship in the own vehicle division line position estimation model in accordance with a change in shape of a road (including a number of lanes and a lane width, for example) during traveling, making it possible to properly estimate the position of the own vehicle division line in accordance with a change in shape of the road.

Fourth Embodiment

Next, an outside recognition system according to a fourth embodiment of the present invention will now be described herein with reference to the accompanying drawings. Note that, in below descriptions, like reference numerals designate identical or corresponding components to those in the outside recognition system 3 according to the first embodiment, and their detailed descriptions are thus omitted.

Figure 16:
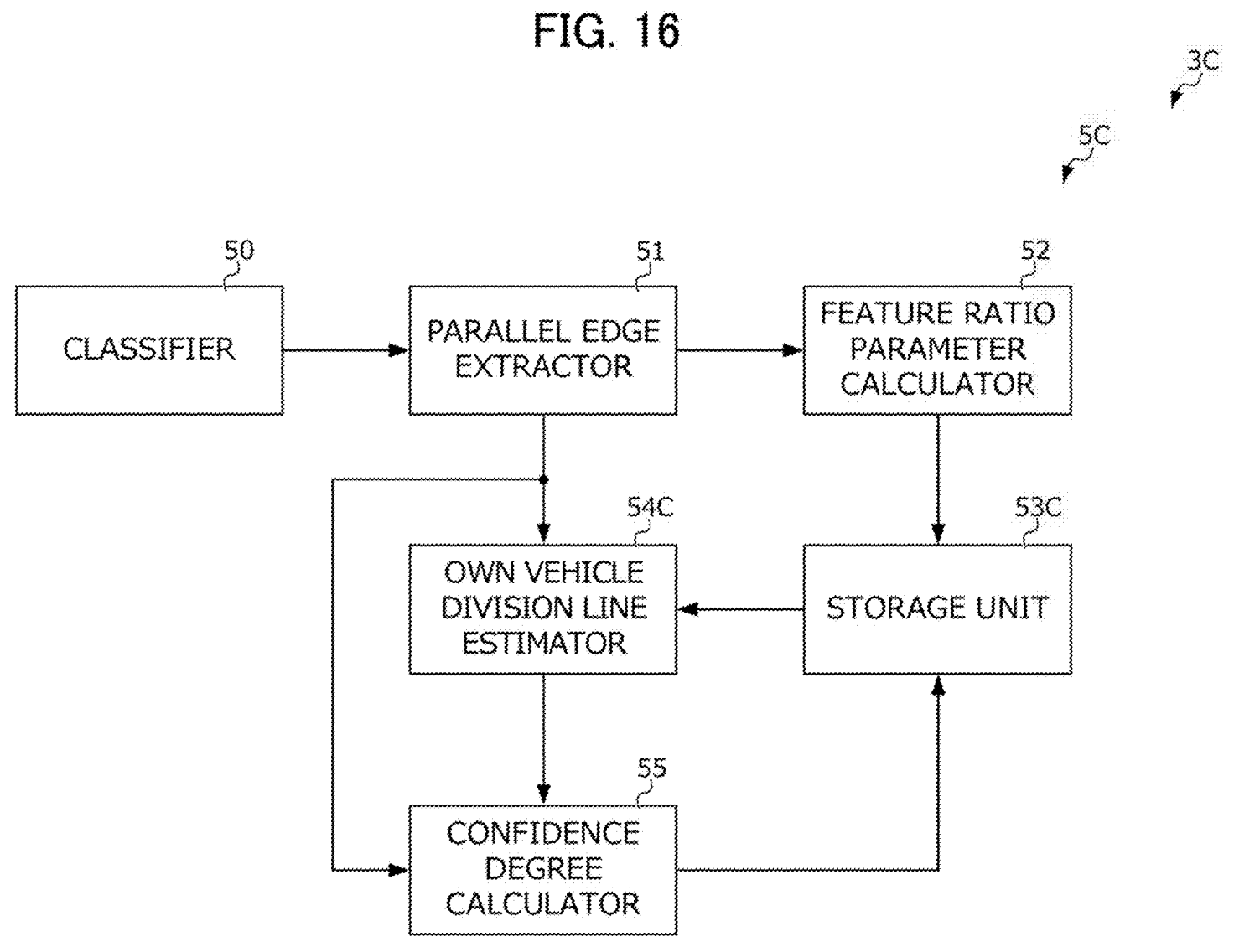

FIG. 16 is a functional block diagram of a travel path recognizer 5C in an outside recognition system 3C according to the present embodiment. The travel path recognizer 5C according to the present embodiment differs from the travel path recognizer 5 according to the first embodiment in that a confidence degree calculator 55 is further included and in configuration in a storage unit 53C and an own vehicle division line estimator 54C.

As described above, a value of a feature ratio defined based on a ratio between a comparison distance and an own vehicle division line distance differs depending on a position of a comparison edge. Therefore, as a confidence degree of a comparison edge extracted by the parallel edge extractor 51 lowers, a confidence degree of a value of a feature ratio, the value being calculated based on position information of the comparison edge, also lowers, and, furthermore, a confidence degree of an own vehicle division line estimated based on the value of the feature ratio, also lowers. Then, the confidence degree calculator 55 uses a procedure described below on a comparison edge extracted by the parallel edge extractor 51 to calculate a value of a confidence degree.

Figure 17:
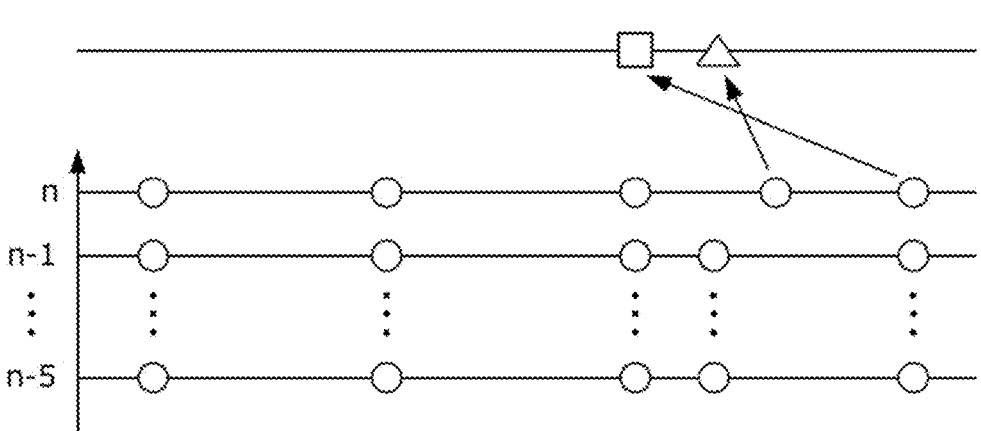
FIG. 17 is a view for describing a procedure of calculating a value of a confidence degree with respect to a comparison edge in a confidence degree calculator.

FIG. 17 is a view for describing a procedure of calculating a value of a confidence degree with respect to a comparison edge in the confidence degree calculator 55. FIG. 17 schematically illustrates positions in the width directions of a plurality of edges extracted by the parallel edge extractor 51 at the times "n", "n–1", . . . "n–5" when the current time is designated as "n". FIG. 17 illustrates, from the left side in order, as circles, positions in the width directions of a reference edge, a left own vehicle division line edge, a right own vehicle division line edge, a first comparison edge, and a second comparison edge. Furthermore, FIG. 17 illustrates a case where the parallel edge extractor 51 has extracted the reference edge, the left own vehicle division line edge, the right own vehicle division line edge, and the second comparison edge all at identical times and at substantially identical positions, respectively but has extracted the first comparison edge at the time "n" at a position slightly closer to the position of the second comparison edge than the other positions extracted at the past times "n–1" to "n–5".

Note herein that cases when the position of the right own vehicle division line edge at the time "n" is estimated based on position information of the first comparison edge at the time "n" and is estimated based on position information of the second comparison edge at the time "n" are compared with each other.

For the position of the right own vehicle division line edge at the time "n", the own vehicle division line estimator 54 is able to estimate, as schematically illustrated by a square in FIG. 17, the right own vehicle division line edge at a substantially proper position, when the position information of the second comparison edge at the time "n" and the values of the feature ratio parameters at the times "n–1" to "n–5" are used. For the position of the right own vehicle division line edge at the time "n", the own vehicle division line estimator 54 is not able to estimate, as schematically illustrated by a triangle in FIG. 17, on the other hand, the right own vehicle division line edge at a proper position, when position information of the first comparison edge at the time "n" and the values of the feature ratio parameters at the times "n–1" to "n–5" are used. Therefore, in the example illustrated in FIG. 17, it can be said that a confidence degree in the case using the first comparison edge is lower than a confidence degree in the case using the second comparison edge.

Then, the confidence degree calculator 55 calculates a value of a confidence degree for each of comparison edges based on a comparison between a position of an own vehicle division line edge extracted by the parallel edge extractor 51 and a position of an own vehicle division line edge, the position being estimated by the own vehicle division line estimator 54. More specifically, the confidence degree calculator 55 calculates a value of a confidence degree of a target comparison edge to allow the calculated value to be smaller as a position of an own vehicle division line edge, the position being estimated by the own vehicle division line estimator 54 based on position information of the target comparison edge, is away from a position of the own vehicle division line edge extracted by the parallel edge extractor 51. Note that the confidence degree calculator 55 may preferably designate a maximum value as "1" and a minimum value as "0", and may calculate a value of a confidence degree of each of comparison edges between the maximum value and the minimum value. Furthermore, at this time, the confidence degree calculator 55 may preferably calculate a value of a confidence degree for each of the comparison edges to allow a total of the values of the confidence degree of all the comparison edges recognized at that time to reach the maximum value.

Returning to FIG. 16, the storage unit 53C stores time-series data of values of feature ratio parameters, the values being calculated for each of the front scene images by the classifier 50, the parallel edge extractor 51, and the feature ratio parameter calculator 52, and time-series data of values of confidence degrees, the values being calculated for the comparison edges by the confidence degree calculator 55. Thereby, in the own vehicle division line estimator 54C described later, it is possible to read and acquire a value of a feature ratio parameter and a value of a confidence degree at a time earlier than a certain time from the storage unit 53C.

The own vehicle division line estimator 54C estimates, based on position information of the reference edge and the comparison edges extracted by the parallel edge extractor 51 at the current time and the values of the feature ratio parameters and the confidence degrees at a time earlier than the current time, the values being stored in the storage unit 53C, a position of an own vehicle division line at the current time.

Figure 18:
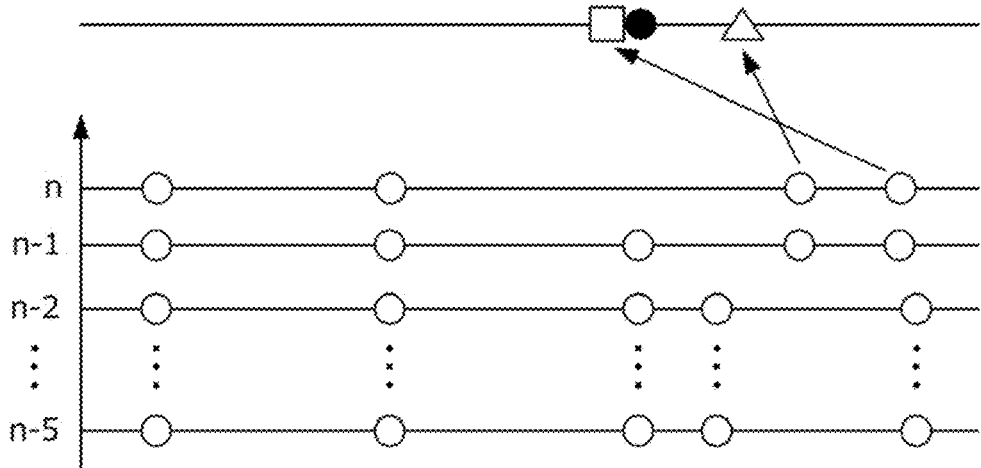
FIG. 18 is a view for describing a procedure of estimating a position of an own vehicle division line based on a value of a confidence degree in an own vehicle division line estimator.

FIG. 18 is a view for describing a procedure of estimating a position of an own vehicle division line based on a value of a confidence degree in the own vehicle division line estimator 54C. FIG. 18 schematically illustrates positions in the width directions of a plurality of edges extracted by the parallel edge extractor 51 at the times "n", "n–1", . . . "n–5" when the current time is designated as "n". FIG. 18 illustrates, from the left side in order, as circles, positions in the width directions of a reference edge, a left own vehicle division line edge, a right own vehicle division line edge, a first comparison edge, and a second comparison edge. Furthermore, FIG. 18 illustrates a case where the own vehicle division line estimator 54C estimates a position of a right own vehicle division line edge since the parallel edge extractor 51 has failed to extract a position of the right own vehicle division line edge at the time "n". Furthermore, it is assumed that, in below description, a value of a confidence degree a1 with respect to the first comparison edge at the time "n–1" be "0.75" and a value of a confidence degree a2 with respect to the second comparison edge at the time "n–1" be "0.75".

In such a case as described above, the own vehicle division line estimator 54C weights the position of the right own vehicle division line, the position being calculated based on position information of the first comparison edge at the time "n" and the values of the feature ratio parameters at the times "n–1" to "n–5" (see a triangle in FIG. 18) and the position of the right own vehicle division line, the position being calculated based on position information of the second comparison edge at the time "n" and the values of the feature ratio parameters at the times "n–1" to "n–5" (see a square in FIG. 18) based on a value of a confidence degree with respect to each of comparison edges to estimate a position of the right own vehicle division line edge. That is, in the example illustrated in FIG. 18, the own vehicle division line estimator 54C estimates that the right own vehicle division line edge exists at a position that internally divides a section between the square and the triangle at a ratio of 1:3 (see a black circle in FIG. 18).

As described above, the own vehicle division line estimator 54C averages positions of an own vehicle division line, the positions being estimated through a procedure similar or identical to that according to the first embodiment based on position information of each of comparison edges at the time "n", under weighting in accordance with a value of a confidence degree of each of the comparison edges, to estimate a position of the own vehicle division line.

With the outside recognition system 3C according to the present embodiment, effects described below are achieved, in addition to the effects illustrated in (1) to (4) described above.

(8) The confidence degree calculator 55 calculates a value of a confidence degree for each of the comparison edges based on a comparison between a position of the own vehicle division line edge extracted by the parallel edge extractor 51 and the position of the own vehicle division line, the position being estimated by the own vehicle division line estimator 54C, the storage unit 53C stores a value of the confidence degree, the value being calculated by the confidence degree calculator 55 at a time earlier than the current time, and the own vehicle division line estimator 54C estimates, based on the position information of the reference edge and the comparison edges at the current time and the values of the feature ratio parameter and the confidence degree, the values being stored in the storage unit 53C, the position of the own vehicle division line at the current time. Therefore, with the outside recognition system 3C, it is possible to estimate a position of an own vehicle division line by taking into consideration a confidence degree of a comparison edge.

Although the embodiments of the present invention have been described, the present invention is not limited to the embodiment. The present invention may be appropriately altered in detailed configuration within the scope of the present invention.

What is claimed is:

1. An outside recognition system comprising:

a front scene image acquirer that acquires an image of a scene on a front side seen from an own vehicle as a front scene image; and a travel path recognizer that recognizes a travel path of the own vehicle based on the front scene image, wherein the travel path recognizer includes:

a classifier that performs segmentation processing on the front scene image to classify photographic objects in the front scene image into a plurality of classes including an own vehicle division line dividing the travel path, and to generate an edge image in which edges of the classes are extracted;

a parallel edge extractor that extracts, from the edge image for the classes, an own vehicle division line edge that is an edge of the own vehicle division line and a plurality of parallel edges that are parallel to the own vehicle division line edge when a field of view of the front scene image acquirer is seen in a plan view, and selects one of the plurality of parallel edges as a reference edge;

a feature ratio parameter calculator that calculates a value of a feature ratio parameter correlated to a feature ratio between a first distance, when the edges other than the reference edge in the plurality of parallel edges are designated as comparison edges, between the reference edge and each of the comparison edges and a second distance between the reference edge and the own vehicle division line edge along a horizontal reference line extending in width directions in the edge image;

a memory that stores a value of the feature ratio parameter, the value being calculated by the feature ratio parameter calculator at a time earlier than a current time; and an own vehicle division line estimator that estimates, based on positions of the reference edge and the comparison edges at the current time and the value of the feature ratio parameter, the value being stored in the memory, a position of the own vehicle division line at the current time.

2. The outside recognition system according to claim 1, wherein the parallel edge extractor extracts, as the parallel edges, edges extending toward a vanishing range centered around a vanishing point that is common in the edge image.

3. The outside recognition system according to claim 2, wherein the parallel edge extractor uses one or more section lines that is or are parallel to the horizontal reference line to partition, in a virtual manner, the edges existing in the edge image each into a plurality of edge line segments, and extracts the edges each including the plurality of edge line segments each extending toward the vanishing range designated for each of partition divisions divided in a virtual manner by the one or more section lines in the plurality of edges included in the edge image as the parallel edges.

4. The outside recognition system according to claim 3, wherein the feature ratio parameter calculator calculates a value of the feature ratio parameter for each of the partition divisions, the memory stores the value of the feature ratio parameter, the value being calculated by the feature ratio parameter calculator, for each of the partition divisions, and the own vehicle division line estimator estimates, based on the value of the feature ratio parameter, the value being stored in the memory for each of the partition divisions, the position of the own vehicle division line at the current time for each of the partition divisions.

5. The outside recognition system according to claim 1, wherein the travel path recognizer further includes a confidence degree calculator that calculates a value of a confidence degree for each of the comparison edges based on a comparison between a position of the own vehicle division line edge extracted by the parallel edge extractor and the position of the own vehicle division line, the position being estimated by the own vehicle division line estimator, the memory stores a value of the confidence degree, the value being calculated by the confidence degree calculator, at a time earlier than the current time, and the own vehicle division line estimator estimates, based on the positions of the reference edge and the comparison edges at the current time and the values of the feature ratio parameter and the confidence degree, the values being stored in the memory, the position of the own vehicle division line at the current time.

6. The outside recognition system according to claim 1, wherein the own vehicle division line estimator estimates the position of the own vehicle division line at the current time to allow the value of the feature ratio at the current time and the value of the feature ratio, the value being calculated based on the value of the feature ratio parameter, the value being stored in the memory, to be equal to each other.

7. The outside recognition system according to claim 2, wherein the own vehicle division line estimator estimates the position of the own vehicle division line at the current time to allow the value of the feature ratio at the current time and the value of the feature ratio, the value being calculated based on the value of the feature ratio parameter, the value being stored in the memory, to be equal to each other.

8. The outside recognition system according to claim 3, wherein the own vehicle division line estimator estimates the position of the own vehicle division line at the current time to allow the value of the feature ratio at the current time and the value of the feature ratio, the value being calculated based on the value of the feature ratio parameter, the value being stored in the memory, to be equal to each other.

9. The outside recognition system according to claim 4, wherein the own vehicle division line estimator estimates the position of the own vehicle division line at the current time to allow the value of the feature ratio at the current time and the value of the feature ratio, the value being calculated based on the value of the feature ratio parameter, the value being stored in the memory, to be equal to each other.

10. The outside recognition system according to claim 5, wherein the own vehicle division line estimator estimates the position of the own vehicle division line at the current time to allow the value of the feature ratio at the current time and the value of the feature ratio, the value being calculated based on the value of the feature ratio parameter, the value being stored in the memory, to be equal to each other.

11. The outside recognition system according to claim 1, wherein the own vehicle division line estimator includes:

a model estimator that uses an own vehicle division line position estimation model causing the positions of the reference edge and the comparison edges to be associated with the position of the own vehicle division line to estimate the position of the own vehicle division line at the current time; and a model updater that updates the own vehicle division line position estimation model based on the value of the feature ratio parameter, the value being stored in the memory.

12. The outside recognition system according to claim 2, wherein the own vehicle division line estimator includes:

a model estimator that uses an own vehicle division line position estimation model causing the positions of the reference edge and the comparison edges to be associated with the position of the own vehicle division line to estimate the position of the own vehicle division line at the current time; and a model updater that updates the own vehicle division line position estimation model based on the value of the feature ratio parameter, the value being stored in the memory.

13. The outside recognition system according to claim 3, wherein the own vehicle division line estimator includes:

a model estimator that uses an own vehicle division line position estimation model causing the positions of the reference edge and the comparison edges to be associated with the position of the own vehicle division line to estimate the position of the own vehicle division line at the current time; and a model updater that updates the own vehicle division line position estimation model based on the value of the feature ratio parameter, the value being stored in the memory.

14. The outside recognition system according to claim 4, wherein the own vehicle division line estimator includes:

a model estimator that uses an own vehicle division line position estimation model causing the positions of the reference edge and the comparison edges to be associated with the position of the own vehicle division line to estimate the position of the own vehicle division line at the current time; and a model updater that updates the own vehicle division line position estimation model based on the value of the feature ratio parameter, the value being stored in the memory.

15. The outside recognition system according to claim 5, wherein the own vehicle division line estimator includes:

a model estimator that uses an own vehicle division line position estimation model causing the positions of the reference edge and the comparison edges to be associated with the position of the own vehicle division line to estimate the position of the own vehicle division line at the current time; and a model updater that updates the own vehicle division line position estimation model based on the value of the feature ratio parameter, the value being stored in the memory.

16. A vehicle controller comprising:

the outside recognition system according to claim 1; and a controller that controls at least one of a steering mechanism, a travel driving device, or a braking device in the own vehicle based on a result of the recognition by the outside recognition system, wherein the controller controls, when there is no photographic object classified into the own vehicle division line seen in the front scene image, at least one of the steering mechanism, the travel driving device, or the braking device based on the position of the own vehicle division line, the position being estimated by the own vehicle division line estimator.

17. A travel path recognition method of causing a computer to recognize, based on a front scene image acquired by a front scene image acquirer that images a scene on a front side seen from an own vehicle, a travel path of the own vehicle, the travel path recognition method comprising:

performing segmentation processing on the front scene image to classify photographic objects in the front scene image into a plurality of classes including an own vehicle division line dividing the travel path, and to generate an edge image in which edges of the classes are extracted;

extracting, from the edge image for the classes, an own vehicle division line edge that is an edge of the own vehicle division line and a plurality of parallel edges that are parallel to the own vehicle division line edge when a field of view of the front scene image acquirer is seen in a plan view, and selecting one of the plurality of parallel edges as a reference edge;

calculating a value of a feature ratio parameter correlated to a feature ratio between a first distance, when the edges other than the reference edge in the plurality of parallel edges are designated as comparison edges, between the reference edge and each of the comparison edges and a second distance between the reference edge and the own vehicle division line edge along a horizontal reference line extending in width directions in the edge image;

allowing a memory to store a value of the feature ratio parameter at a time earlier than a current time; and estimating, based on positions of the reference edge and the comparison edges at the current time and the value of the feature ratio parameter, the value being stored in the memory, a position of the own vehicle division line at the current time.

18. A non-transitory medium storing a computer program causing a computer to recognize, based on a front scene image acquired by a front scene image acquirer that images a scene on a front side seen from an own vehicle, a travel path of the own vehicle, the computer program causing the computer to execute a process comprising:

performing segmentation processing on the front scene image to classify photographic objects in the front scene image into a plurality of classes including an own vehicle division line dividing the travel path, and to generate an edge image in which edges of the classes are extracted;

extracting, from the edge image for the classes, an own vehicle division line edge that is an edge of the own vehicle division line and a plurality of parallel edges that are parallel to the own vehicle division line edge when a field of view of the front scene image acquirer is seen in a plan view, and selecting one of the plurality of parallel edges as a reference edge;

selecting one of the plurality of parallel edges as a reference edge;

calculating a value of a feature ratio parameter correlated to a feature ratio between a first distance, when the edges other than the reference edge in the plurality of parallel edges are designated as comparison edges, between the reference edge and each of the comparison edges and a second distance between the reference edge and the own vehicle division line edge along a horizontal reference line extending in width directions in the edge image;

allowing a memory to store a value of the feature ratio parameter at a time earlier than a current time; and estimating, based on positions of the reference edge and the comparison edges at the current time and the value of the feature ratio parameter, the value being stored in the memory, a position of the own vehicle division line at the current time.

* * * * *